US011720424B2

(12) United States Patent
Piagentini et al.

(10) Patent No.: US 11,720,424 B2
(45) Date of Patent: Aug. 8, 2023

(54) SINGLE FLOW EXECUTION

(71) Applicant: Salesforce, inc., San Francisco, CA (US)

(72) Inventors: Federico Ariel Piagentini, Buenos Aires (AR); Guillermo Sebastian Fernandes, Buenos Aires (AR); Pablo Gerardo Kraan Brun, Buenos Aires (AR); Rodrigo Ezequiel Merino, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 102 days.

(21) Appl. No.: 17/200,425

(22) Filed: Mar. 12, 2021

(65) Prior Publication Data

US 2022/0291977 A1 Sep. 15, 2022

(51) Int. Cl.
*G06F 9/54* (2006.01)
*G06F 8/60* (2018.01)
*G06F 21/16* (2013.01)
*G06F 9/451* (2018.01)

(52) U.S. Cl.
CPC .............. *G06F 9/546* (2013.01); *G06F 8/60* (2013.01); *G06F 9/451* (2018.02); *G06F 21/16* (2013.01); *G06F 2221/0737* (2013.01)

(58) Field of Classification Search
CPC . G06F 9/546; G06F 8/60; G06F 9/451; G06F 21/16; G06F 2221/0737
See application file for complete search history.

(56) References Cited

U.S. PATENT DOCUMENTS

| | | | |
|---|---|---|---|
| 2003/0086551 A1* | 5/2003 | Burr | H04M 15/90 379/221.08 |
| 2003/0103460 A1* | 6/2003 | Kamath | H04L 47/27 709/234 |
| 2004/0230941 A1* | 11/2004 | Marin | G06Q 10/10 717/100 |
| 2006/0168024 A1* | 7/2006 | Mehr | H04L 63/14 709/206 |
| 2007/0222578 A1* | 9/2007 | Iwamura | G08B 27/003 340/538 |
| 2007/0245352 A1* | 10/2007 | Ma | H04L 67/1001 718/105 |

(Continued)

*Primary Examiner* — Tuan C Dao
(74) *Attorney, Agent, or Firm* — Holland & Hart LLP

(57) ABSTRACT

Methods, systems, and devices supporting data processing are described. In some systems, a user device may leverage a single flow execution (SFE) service for an application including a flow. A connector may retrieve one or more messages using a polling source, and a processing component may process a single message of the retrieved messages (e.g., to avoid processing complexity and error propagation associated with batch or periodic polling). The processing component may disable the connector upon retrieving at least one message and may execute the flow for the deployed application on the single message of the retrieved message, for example, based on an indication to run the SFE. Upon completion of executing the flow on the message, the processing component may store, at a collector, information related to the flow execution and may undeploy the application from a runtime engine instance based on completing the SFE for the application.

18 Claims, 13 Drawing Sheets

(56) References Cited

U.S. PATENT DOCUMENTS

| | | | |
|---|---|---|---|
| 2010/0109901 A1* | 5/2010 | Martin-Cocher | H04L 65/1016 705/14.58 |
| 2011/0307897 A1* | 12/2011 | Atterbury | G06F 9/4494 718/102 |
| 2013/0198311 A1* | 8/2013 | Tamir | H04L 69/12 709/212 |
| 2013/0308645 A1* | 11/2013 | Karino | H04L 45/745 370/392 |
| 2015/0347209 A1* | 12/2015 | Lyubinin | G06F 9/485 719/313 |
| 2016/0104090 A1* | 4/2016 | Alekseyev | H04L 43/16 705/7.39 |
| 2017/0295164 A1* | 10/2017 | Sakurai | H04L 63/0807 |
| 2020/0394098 A1* | 12/2020 | Frazier | G06F 11/079 |
| 2021/0120080 A1* | 4/2021 | Mishra | H04L 67/1008 |
| 2021/0185001 A1* | 6/2021 | Tran | H04L 51/06 |
| 2022/0030030 A1* | 1/2022 | Sofer | H04L 63/20 |

* cited by examiner

SINGLE FLOW EXECUTION

FIELD OF TECHNOLOGY

The present disclosure relates generally to database systems and data processing, and more specifically to a single flow execution (SFE).

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some systems may allow users to define flows, such as an integration flow, for processing messages. An application may support user-based design and creation of the integration flow. However, allowing a user to design an integration flow may result in potential errors within the integration flow, for example, based on user error, insufficient testing, inefficient resource usage, or other issues. In some cases, a connector to a polling source may retrieve batches of messages, such that multiple messages are received at a time and processed by the application. Additionally or alternatively, the connector may retrieve messages from the polling source according to a periodicity, resulting in multiple messages being retrieved from the polling source. As such, the system may send multiple messages through an integration flow, potentially leading to multiple messages being processed incorrectly (e.g., based on one or more errors in the integration flow), unclear analysis of how specific messages are processed, or both.

DETAILED DESCRIPTION

Figure 1:
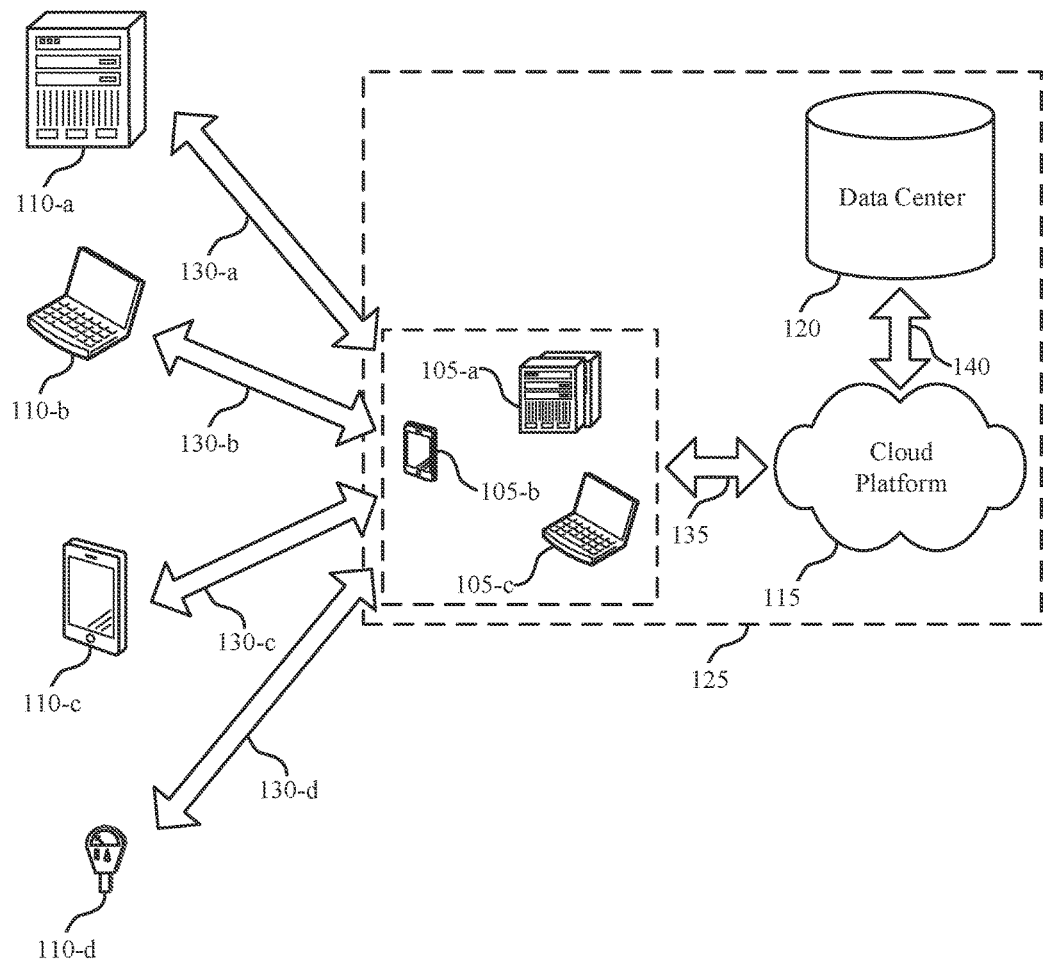
FIG. 1 illustrates an example of a single flow execution (SFE) system that supports SFE in accordance with aspects of the present disclosure.

Some systems may allow users to define flows for processing messages, such as integration flows. For example, an application may include a flow of components, connectors, and modules that process messages received from other systems (e.g., from an external source via a polling source). An application server, a database server, a local machine, or another platform accessible to a user may allow the user to design and create an integration flow. The user may initiate a design session on the application server and design an integration flow that includes various triggers, data transformations, metadata, or some combination of these or other elements. To initially test a flow defined by a user, the user may want to send a single message through the flow and analyze the results (e.g., to test for errors, analyze performance, or both). In some cases, however, the connector to the external source may retrieve batches of messages, such that multiple messages are received at a time and processed by the application. Additionally or alternatively, the connector may retrieve messages from the external source according to a periodicity, resulting in multiple messages being retrieved from the external source. As such, the system may send multiple messages through the flow, potentially leading to multiple messages being processed incorrectly (e.g., if there are errors in the designed integration flow), unclear analysis of how specific messages are processed, or both.

As describe herein, a server or service running the application on the server, database server, local machine, or other platform may provide a single flow execution (SFE) service to a user to ensure a single message is processed by a flow. The SFE service may avoid sending multiple messages through a flow to test the flow, may avoid missing messages for processing, and may support SFE without changing the definition of the flow. For example, when the SFE is called by a user, an application including the flow (e.g., an integration flow) may be deployed to a runtime engine instance. The connector for the application may be setup (e.g., between a polling source and an external source) and the application may make calls to the polling source until at least one message is received from the external source. Once at least one message is received, the connector may be disabled (e.g., such that the polling source stops retrieving further messages for the application). The service may send a single message received from the external source to the application for processing. In some cases, the service may execute the flow using the single message, and the service may refrain from sending any additional messages to the application for processing in parallel. That is, even if multiple messages are retrieved from the external source in a batch, a single message may be processed by the flow. The service may stop and undeploy the application from the runtime engine instance based on the single message completing processing and the corresponding results of the SFE being stored for analysis.

Aspects of the disclosure are initially described in the context of an environment supporting an on-demand database service. Additional aspects of the disclosure are described with reference to architecture diagrams, integration processes, deployment diagrams, and process flows. Aspects of the disclosure are further illustrated by and described with reference to apparatus diagrams, system diagrams, and flowcharts that relate to SFE.

FIG. 1 illustrates an example of a system 100 for cloud computing that supports SFE in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, a user operating a user device, such as a cloud client 105, may develop an application (e.g., an integration application) to perform integration of one or more different processes, devices, systems, or a combination thereof. The user device may interface with one or more application programming interfaces (APIs) for creation, modification, evaluation, or other operations associated with a related integration flow. In some cases, the user device may build and test the integration application via an integration flow API by running the application in a test mode. The integration flow API may implement a polling process in which a connector accesses data from an external source (e.g., via a polling source) when a trigger occurs in the test mode. In some examples, the connector to the external source may retrieve multiple messages (e.g., a batch of messages or periodically retrieved messages), which the application may in turn receive and process. However, if the integration flow API processes multiple messages during a test (e.g., by running multiple messages through the integration flow, for example, in parallel), more than one message may be processed incorrectly. Additionally or alternatively, the integration flow API may fail to track or otherwise analyze how specific messages are processed in the flow.

In some examples, to support testing of an integration flow, the user device may leverage an SFE service to automatically process a single message by the integration flow. In some cases, the SFE service may support execution of a flow on a single message for other purposes beyond testing (e.g., iterative message processing, single message processing on demand). For example, a user may trigger message processing on demand using the SFE service for an application that may infrequently satisfy a trigger condition for execution (e.g., once every few hours) rather than constantly run the application and monitor for the trigger condition. The SFE service may access one or more messages from an external source (e.g., using a polling source and a connector) and the integration flow API may process a single message without interference from batch polling or periodic polling messages. The integration flow API may execute the integration flow based on activating a trigger. In some cases, the integration flow API may specify to the connector to access information from an external source for a single event, such as a user transaction. The connector may retrieve one or more messages, such as data records, from the external source. After the integration flow API receives at least one message, the integration flow API may disable the connector. The integration flow may process the information for a single message from the event. Once the integration flow has processed the information, the integration flow API may automatically undeploy the application from a runtime engine based on completing the integration flow for the single message. The integration flow API may send the results of the test for display at a user device, such that a user may view and understand the results of the SFE (e.g., based on the single event).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure and accordingly do not represent all of the technical improvements provided within the scope of the claims.

Figure 2:
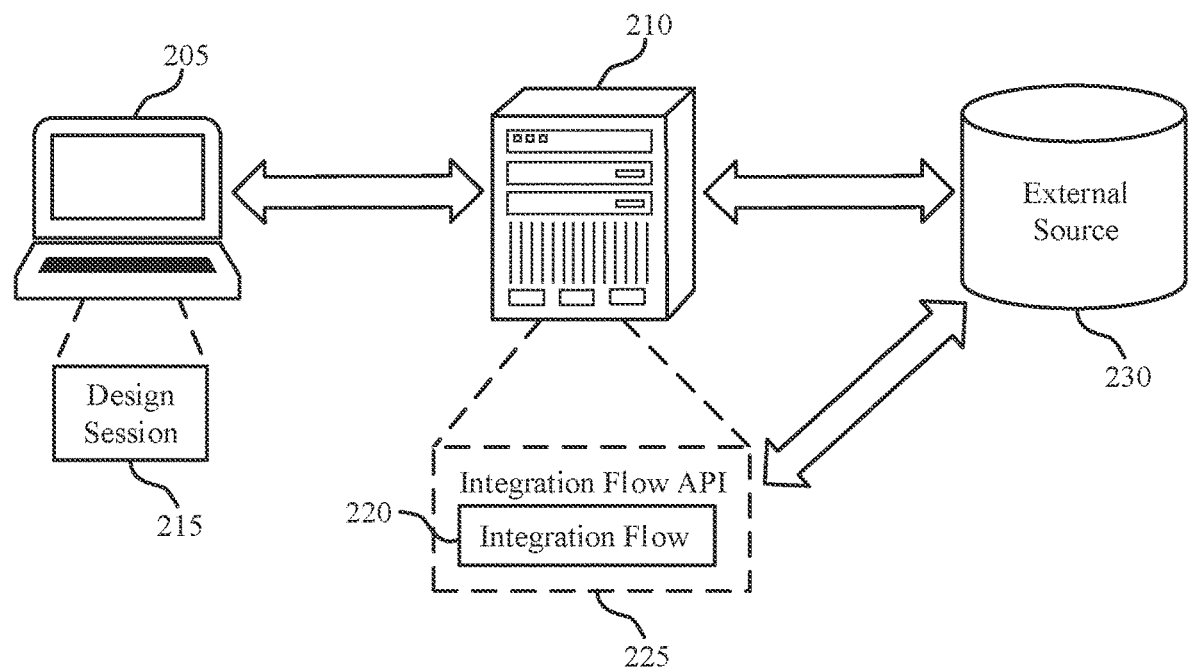
FIG. 2 illustrates an example of an architecture diagram that supports SFE in accordance with aspects of the present disclosure.

FIG. 2 illustrates an example of an architecture diagram 200 that supports SFE in accordance with aspects of the present disclosure. The architecture diagram 200 may include a user device 205 and a processing component 210, which in some cases may be a component of the user device 205. The processing component 210 may be an example of, or interface with, an application, an application server, a database server, a cloud-based server, a server cluster, a virtual machine, a container, or any combination of these or other devices or systems of devices. In some cases, the user device 205 may be an example of a client device running a client application, such as a cloud client 105 as described with reference to FIG. 1. The user device 205 may trigger an SFE for a single message from a polling source.

In some examples, a user operating the user device 205 may develop an application to perform integration of one or more different processes. For example, the user device 205 may provide a user interface for the user to design an integration flow 220 integrating multiple software applications, systems, data sources, or a combination thereof. The integration flow 220 may define a flow of data through one or more processes, transformations, logical steps, or some combination thereof, for example, to automate a business task or another set of operations. In some cases, the user interface may provide drag-and-drop solutions or other interface techniques to allow a user to define the integration flow 220 without writing code.

The processing component 210 may support an integration flow API 225 through which one or more user devices 205 may interface with design sessions 215 and integration flows 220 (e.g., at design-time, during testing, or the like). The processing component 210 may be a component of the user device 205 or may be an example of a backend component (e.g., a server, cloud resources, or another processing component 210) supporting a design session 215. The user device 205 may establish a design session 215 with the processing component 210 in which a user operating the user device 205 may design an application including an integration flow 220 (e.g., using an integration flow API 225). In some examples, the user device 205 may interface with the integration flow API 225 for creation, modification, evaluation, or other operations associated with the related integration flow 220. The integration flow API 225 may receive API requests from the user device 205 associated with a design session 215 and an integration flow 220 and may perform one or more operations based on the API requests.

In some cases, the user device 205 may test the integration application during a design session 215 via the integration flow API 225 by running the application in a test mode. The integration flow API 225 may execute the application in the test mode for a duration (e.g., up to 5 minutes). The integration flow API 225 may provide step by step input and output to the user device 205 for the integration flow 220 (e.g., by implementing aspects of an event model API that uses information from an event, such as a transaction). The integration flow API 225 may implement a polling process in which a connector accesses data from an external source 230 using a polling source, for example, when a trigger occurs in the test mode. In some cases, the external source 230 may be an example of a database, a data storage system, an application, or any other external source 230. The connector to the external source may retrieve messages (e.g., a batch of messages or periodically retrieve messages), which the application may receive and process. However, if the integration flow API 225 processes multiple messages during a test (e.g., by running multiple messages through the integration flow 220), more than one message may be processed incorrectly by the integration flow 220 before an error may be identified, the integration flow API 225 may fail to track and/or surface processing information for specific messages, or both.

In some examples, to support efficient testing of an integration flow 220 or to otherwise process a single message at an integration flow 220, the user device 205 may leverage an SFE in which a connector accesses one or more messages from an external source 230 (e.g., using a polling source), and the integration flow API 225 may process the results from a single message without interference from batch polling or periodic polling messages. For example, the user device 205 may execute the application (e.g., a citizen application) in a test mode during a design session 215. The application may include one or more components, one or more connectors, one or more modules, or a combination thereof organized into a flow (i.e., the integration flow 220). In some cases, a connector may connect the processing component 210 to an external source 230, such that external source 230 may communicate data or other information with the processing component 210. In some examples, the system may support different types of connectors, such as a database connector, an application-specific connector, or the like.

The integration flow API 225 may execute the integration flow 220 based on activating a trigger. For example, a trigger may be periodically or dynamically set to an on value, which may initiate the integration flow 220. In some examples, the integration flow API 225 may set the trigger to an on value according to a poll time interval (e.g., a 5 second periodicity, a 5 minute periodicity, a 1 hour periodicity, or any other supported periodicity). The trigger may generate an event, and the integration flow 220 may process the event. The event may be application-based, such as receiving a notification, transmitting a notification, initializing an action from a user of the application, or the like. In some cases, the integration flow API 225 may specify to the connector to access information from an external source 230 for a single event, such as a user transaction. The external source 230 may store data from the event, one or more messages from the event, or both. The connector may retrieve one or more messages, such as data records, communication messages, or both from the external source 230. After the integration flow API 225 receives at least one message, the integration flow API 225 may disable the connector. Thus, the connector may not provide any additional information from the external source 230 following retrieval of a first message.

The integration flow 220 may process the information for a single message from the event for a duration. In some cases, the single message may include a single data object, a single email message, a single short message service (SMS) text message, a single voice call, or a single document. That is, the single message may be an example of a single unit of information according to a trigger. The integration flow API 225 may process the single message within a processing duration (e.g., based on a time-out parameter). Once the integration flow 220 has processed the information or once the duration has expired, the integration flow API 225 may stop executing the integration flow 220 for the application, which may terminate the program. That is, the integration flow API 225 may undeploy the application from a runtime engine based on completing the integration flow 220 (or a subset of the integration flow 220) for the single message or based on the execution timing out. In some examples, the integration flow API 225 may use a parameter, such as a property placeholder, for configuring a schedule strategy of on triggers for triggering a polling source, triggering execution of the integration flow 220 on a single message, or both.

The integration flow API 225 may store the results of processing the single message by the integration flow 220. In some cases, the integration flow API 225 may configure and send the results (or a subset of the results) to the user device 205 for display in a user interface. The user device 205 may display the results such that a user may view and understand the results of the SFE (e.g., based on the single event).

In some examples, the integration flow API 225 may implement an interception API to expose an input and output for each integration flow 220 component for a single event. For example, the interception API may intercept a first message sent from the external source 230 to the integration flow 220 (e.g., via a polling source) and may stop the external source 230 (or the polling source) from sending any additional messages upon intercepting the first message. Additionally or alternatively, the integration flow API 225 may intercept a message or other data output by the integration flow 220 to stop the integration flow 220 and undeploy the application including the integration flow 220. The integration flow API 225 may generate a notification for the user device 205, such as an agent transaction notification, and may display an input value (e.g., based on the single input message) and an output value (e.g., based on completing execution of the integration flow 220 on the single message) for the single event during each process in the integration flow 220. In some examples, the integration flow API 225 may store the results of the SFE in a database or other storage device.

In some examples, when the connector retrieves a message or set of messages for an event and inputs the message(s) to the integration flow 220, the integration flow API 225 may implement a watermark method. The watermark method may involve flagging the message or set of messages such that the integration flow 220 may not be process the same message(s) again for another test application or when the application is running in production. If performing an SFE, the watermark may increment by one for each SFE of the integration flow 220 (e.g., based on the integration flow 220 processing a single message). Additionally or alternatively, the watermark may be an example of a timestamp, a message identifier (ID), or another value to indicate a latest message processed by the integration flow 220.

In some examples, the integration flow API 225 may record an acknowledgment that a single event (e.g., the message for the event) is being processed by the integration flow 220. When the user device 205 runs the SFE, the integration flow 220 may trigger a polling source, and the connectors may in turn retrieve a watermark from an operating system of the user device 205, the processing component, or another storage component. The connector may use the watermark, if present, to determine from which point to query data from the external source 230. Otherwise, the connector may use internal logic to determine from which point to query data. Additionally or alternatively, a connector may fetch a batch of messages, or records, and may send each message to a polling context implemented by the integration flow API 225. The integration flow API 225 may determine which messages to dispatch to the integration flow 220 for processing. For example, if running based on the SFE service, the integration flow API 225 may send a single message to the integration flow 220 for processing. In some other examples, the dispatching mechanism may be asynchronous. That is, while the integration flow 220 is processing an input event, the source may dispatch other messages to the integration flow 220. As soon as a message is dispatched, the integration flow API 225 may update a corresponding watermark. In some examples, the polling source supporting the connector to the external source 230 may set the watermark field, which may be defined by a timestamp, incremental value, or other value. The integration flow 220 may receive messages from a batch of messages loaded during the execution in later executions based on the watermark field, or the polling source may retrieve one or more additional messages from the external source 230 for processing based on the watermark field.

In some examples, the test application may share information between an external source 230 and one or more cloud services to keep the watermark values current. In some examples, the identity of the operating system may be defined during runtime by the name of the application. In some examples, to reduce deployment times, the integration flow 220 may implement a session to reuse a class loader, execution content, extension models, or the like.

Figure 3:
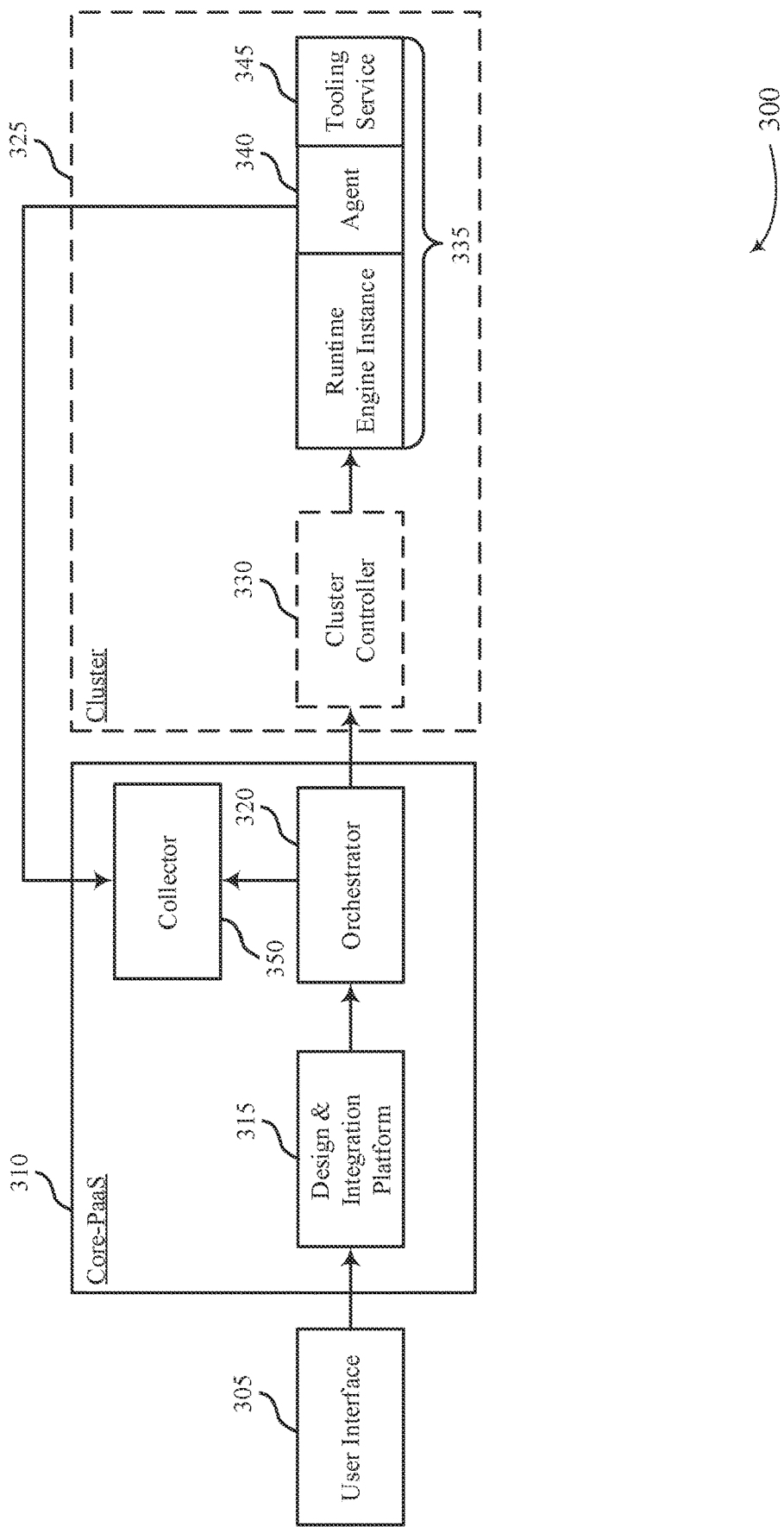
FIG. 3 illustrates an example of an integration process that supports SFE in accordance with aspects of the present disclosure.

FIG. 3 illustrates an example of an integration process 300 that supports SFE in accordance with aspects of the present disclosure. The integration process 300 may be implemented by one or more components in architecture diagram 200 as described with reference to FIG. 2. For example, a user interface (UI) 305, which may be implemented by a user device 205 as described with reference to FIG. 2, may trigger an execution of an integration flow for a single data record or message. The UI 305 (e.g., a citizen UI) may be an example of a computer system capable of receiving an input from a user to run an application, such as an integration service, in a test mode or another SFE mode.

In some examples, a user device may execute an application (e.g., a citizen application) in a test mode via the UI 305. The UI 305 may be connected to—or otherwise communicate with—a core-platform as a service (PaaS) 310. The core-PaaS 310 may support the integration of multiple applications run by the user device. For example, once the user device receives an input to execute the application in the test mode, the UI 305 may send an execution trigger or other information to a design and integration platform 315 of the core-PaaS 310. The design and integration platform 315 may deploy the application into a runtime engine instance 335. In some examples, the platform 315 (e.g., a citizen platform) may communicate with an orchestrator 320 (e.g., a metadata services (MDS) orchestrator) to run an SFE.

Once the orchestrator 320 determines the UI 305 has initiated an SFE, the orchestrator 320 may use a connector to access an cluster 325 (e.g., an MDS cluster) and configure a runtime engine instance 335. In some examples, the cluster 325 may spin up a server or other processing component (e.g., initiating a start operation to activate the processing component) to host the runtime engine instance 335 (e.g., a citizen runtime).

In some cases, the core-PaaS 310 may access the cluster 325 via a cluster controller 330 (e.g., an MDS cluster controller). For example, the cluster controller 330 may select a runtime engine instance 335 from a cluster 325 of possible runtime engine instances and may deploy the application to the runtime engine instance 335. In some cases, the cluster controller 330 may select the runtime engine instance 335 based on available resources for the runtime engine instance 335, a predicted resource overhead for the application, or a combination thereof. In some other cases, the application may be deployed locally at a user device (e.g., as opposed to on a runtime engine instance 335 from a cluster 325). That is, the application may be tested with an SFE locally at a user device or on backend resources (e.g., a server, virtual machine, cloud resource, or the like) hosting a runtime engine instance 335.

The design and integration platform 315, the orchestrator 320, or both may deploy the application into the runtime engine instance 335 (e.g., in response to the trigger to run the SFE). The runtime engine instance 335 may use one or more tools or components to establish a connector to retrieve one or more messages for an event from an external source, such as a database. For example, the runtime engine instance 335 may use a polling source to handle a polling trigger for the application. The polling source may query for messages from the external source according to an activated polling trigger (e.g., based on the periodicity of the polling trigger, based on a predetermined duration, or the like). The polling source may pass the one or more messages for the event to the runtime engine instance 335, which may include an agent 340 (e.g., an MDS agent) and a transaction server, such as a tooling service 345 (e.g., a Mule tooling service (MTS)). The tooling service 345 may include a set of APIs that collect tooling information from the application. During runtime, the runtime engine instance 335 may deactivate or otherwise disable the connector to the external source for retrieving the messages in response to retrieving at least one message from the external source. Thus, the application may not receive additional messages while running according to the SFE.

In some cases, the runtime engine instance 335 may execute the flow for the deployed application using a single message received from the external source. The message may be processed by a number of components within the flow until completion of a path of the flow (e.g., reaching an output of the flow). The agent 340 or another component of the runtime engine instance 335 may indicate to the core-PaaS 310 that the SFE is complete. For example, the agent 340 may indicate to a collector 350 (e.g., an MDS collector) that the SFE is complete. The indication may include the input and output values for multiple components (e.g., each component or each tracked component) of the flow execution. The runtime engine instance 335 may update a watermark to indicate the message was processed by the flow (e.g., based on a timestamp, an incremental value, or both) once the flow is complete. In some other examples, the runtime engine instance 335 may update the watermark for one or more messages based on retrieving the one or more messages from the external source. In some cases, the watermark may be stored by the collector 350 or other persistent memory. Thus, for future flow executions, a runtime engine instance 335 may retrieve the watermark and may not retrieve messages that have already passed through the flow based on the current value of the watermark.

The design and integration platform 315, the orchestrator 320, the cluster controller 330, or a combination thereof may stop and undeploy the application from the runtime engine instance 335 based on completing execution of the flow for the single message. For example, after sending the execution information to the collector 350 for storage, the application may be undeployed from the runtime engine instance 335 and the runtime engine instance 335 resources may be released to a pool of available resources for the cluster 325. In some cases, the execution information generated by executing the flow for the single message may include state information, processing time for specific components within the flow, input information for specific components within the flow, output information for specific components within the flow, or any combination thereof. The execution information may be bundled as a single transaction and sent to the collector 350 for storage, analysis, or both. In some cases, the design and integration platform 315 may consume the execution information from the collector 350, for example, based on undeploying the runtime engine instance 335. The design and integration platform 315 may return a status of the SFE for the application, a message history payload for the SFE (e.g., based on the execution information), an output of the SFE, or a combination thereof to the UI 305 for display.

Figure 4:
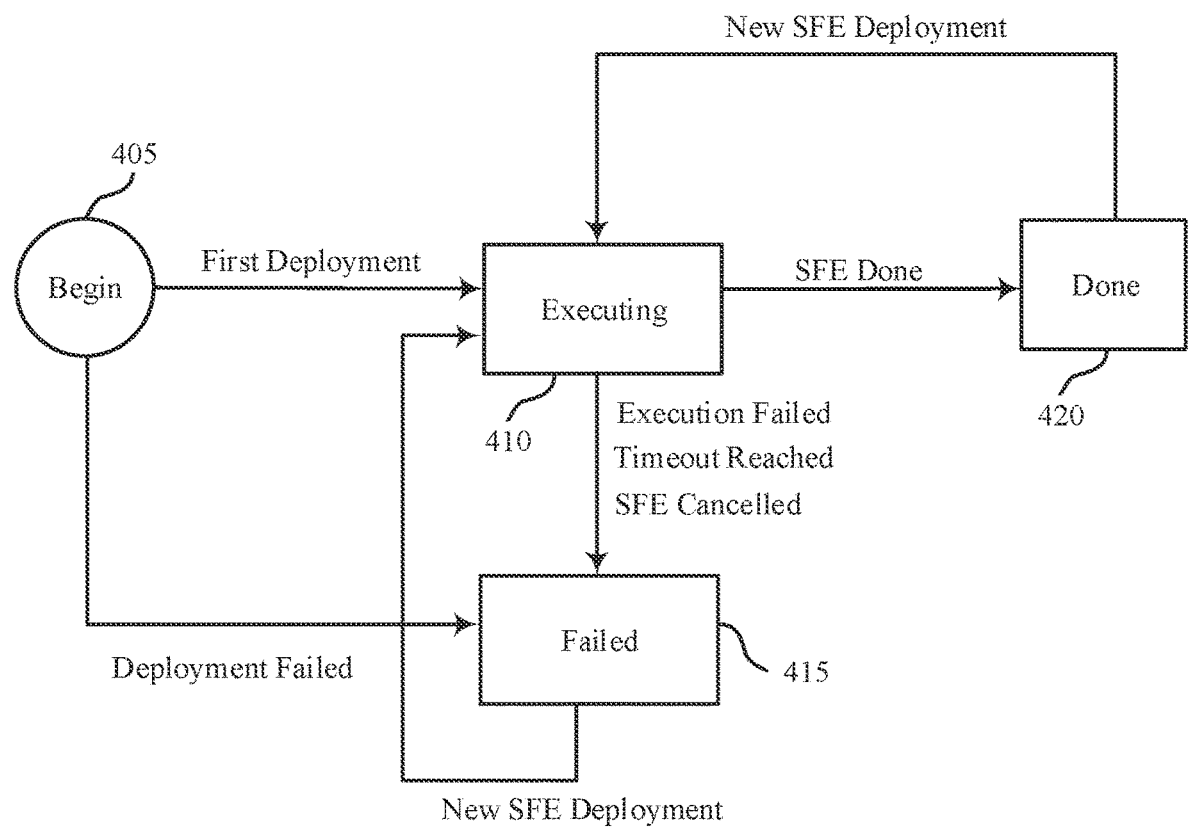
FIGS. 4 and 5 illustrate examples of deployment diagrams that support SFE in accordance with aspects of the present disclosure.

FIG. 4 illustrates an example of a deployment diagram 400 that supports SFE in accordance with aspects of the present disclosure. The deployment diagram 400 may implement aspects of architecture diagram 200 and may support an integration process 300 as described with reference to FIGS. 2 and 3. For example, a user device, such as a user device 205 as described with reference to FIG. 2, may deploy an application for an SFE, such that the user may collect data associated with processing a single message by the application (e.g., through an integration flow). The deployment diagram 400 may include states accessible to a user via status endpoints (e.g., MDS status endpoints).

A user operating a user device may select to trigger an SFE (e.g., a test flow) for an application. For example, the user may design a flow for an application in the UI and may select a "test flow" option in the UI, triggering the SFE for the application. A platform may package the application for an SFE test and may assign a property placeholder to a scheduler strategy for a trigger (e.g., a polling trigger, an execution trigger). The platform may automatically change the property placeholder during deployment of the application; for example, the scheduler strategy (e.g., a trigger periodicity) for the trigger may be different in the SFE mode than in a production mode. In some cases, the trigger may run more frequently in the SFE mode than in the production mode until a message is fetched and the flow is dispatched. In some cases, triggering deployment of the application may cause a UI to trigger an action through a platform to an orchestrator, hitting an endpoint (e.g., POST/single-execution-test-application). Such components may be described in more detail with reference to FIG. 3.

In some examples, at 405, the user device may begin a first deployment of the application by executing an integration flow for a single message. The application may be deployed into a runtime engine instance, as described herein with reference to FIG. 3. Once the user device begins the deployment, the status of the application (e.g., if requested by an orchestrator using a GET/single-execution-test-application endpoint) may be EXECUTING 410. A status of EXECUTING 410 may indicate that the application is deploying, the flow is executing (e.g., processing a single message), the events of the executed flow have not completed publishing, or any combination thereof.

If the first deployment fails, that status may update to FAILED 415 and the API controlling the deployment may initiate a new SFE deployment. Similarly, if the execution of the flow fails, times out, or the SFE is otherwise canceled, the status may update to FAILED 415. The API may initiate a new SFE deployment if the application fails for any reason. In some examples, rather than initiate the new SFE deployment, the system may surface an error log or other information indicating data associated with the failure (e.g., for debugging or other error handling).

In some examples, the SFE may execute successfully. A successful execution of the SFE may mean each step of the integration flow is completed successfully or each step of one sub-path of the integration flow is completed successfully. The runtime engine instance may package logged information associated with the flow events of the integration flow into a transaction and may push the transaction to a collector (as described herein with reference to FIG. 3. The system may updated the status of the application to DONE 420. In some cases, the user device may begin a new SFE deployment once the initial SFE deployment is done, which may include executing the new SFE deployment. Additionally or alternatively, the platform may read the DONE 420 status of the application and may use the orchestrator and a GET/messages endpoint for an API to get the transaction pushed to the collector. The platform may send information about the execution of the flow to the user device for display. For example, the user device may display the DONE 420 status or a FAILED 415 status, information captured for the transaction (e.g., for processing the message at specific flow events within the flow), or some combination thereof in a UI.

Figure 5:
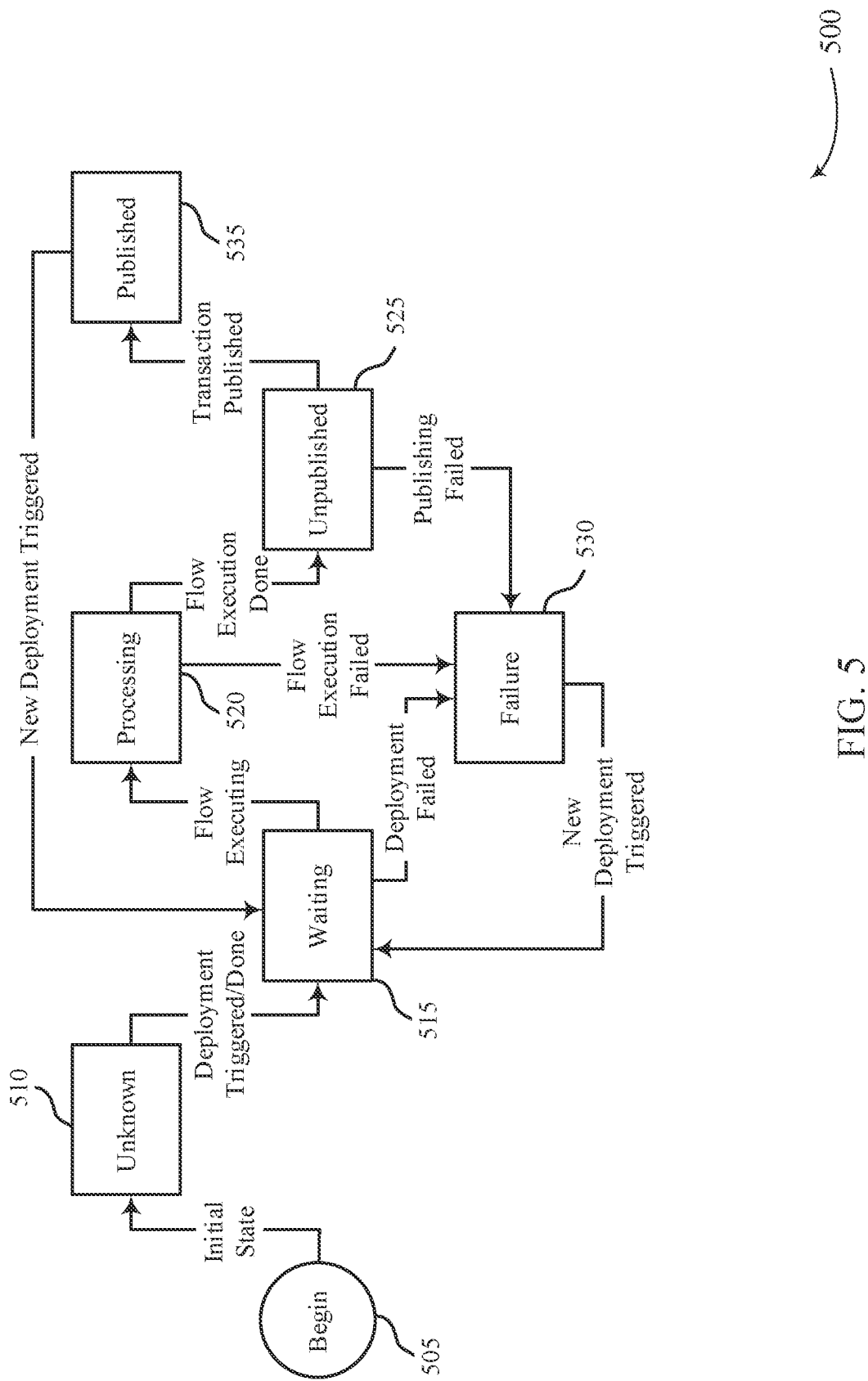

FIG. 5 illustrates an example of a deployment diagram 500 that supports SFE in accordance with aspects of the present disclosure. The deployment diagram 500 may implement aspects of architecture diagram 200 and may support an integration process 300 as described with reference to FIGS. 2 and 3. For example, a user device, such as a user device 205 as described with reference to FIG. 2, may deploy an application for an SFE, such that the user may collect data associated with processing a single message by the application (e.g., through an integration flow). The deployment diagram 500 may include internal states for SFE processing that may be inaccessible to a user via status endpoints (e.g., states that are not exposed outside MDS).

In some examples, at 505, the user device may begin a first deployment of the application by executing an integration flow for a single message. The deployment may have an initial state, which may be UNKNOWN 510. Once the deployment has triggered or the deployment is done (e.g., based on setting up a runtime engine instance with the deployed application), the application status may be updated to WAITING 515. If the deployment is successful, the application may periodically or aperiodically request a message from a source for processing (e.g., based on a polling trigger). If a message is retrieved from a source, the message may be sent to the flow for SFE and the application status may be updated to PROCESSING 520 (e.g., while the message is being processed by the flow). The runtime engine instance may log data associated with processing the message, including timestamps, processing resources, input and output information for specific flow components, values, variables, and/or metadata associated with the message as it is modified throughout execution of the flow. If the flow successfully completes processing of the message, the application status may be updated to UNPUBLISHED 525 and the runtime engine instance may package the logged data into a single transaction. The runtime engine instance may send the transaction to a collector for storage, analysis, publishing, or some combination thereof. If the publishing of the transaction is successful, the application status may be updated to PUBLISHED 535. However, if the deployment fails, the flow execution fails, the publishing fails, or a combination thereof, the application status may be updated to FAILURE 530. In some cases, the system or a user may trigger a new SFE deployment based on completion of an SFE (e.g., either because the SFE failed or the SFE was successfully completed and the results were published).

Figure 6:
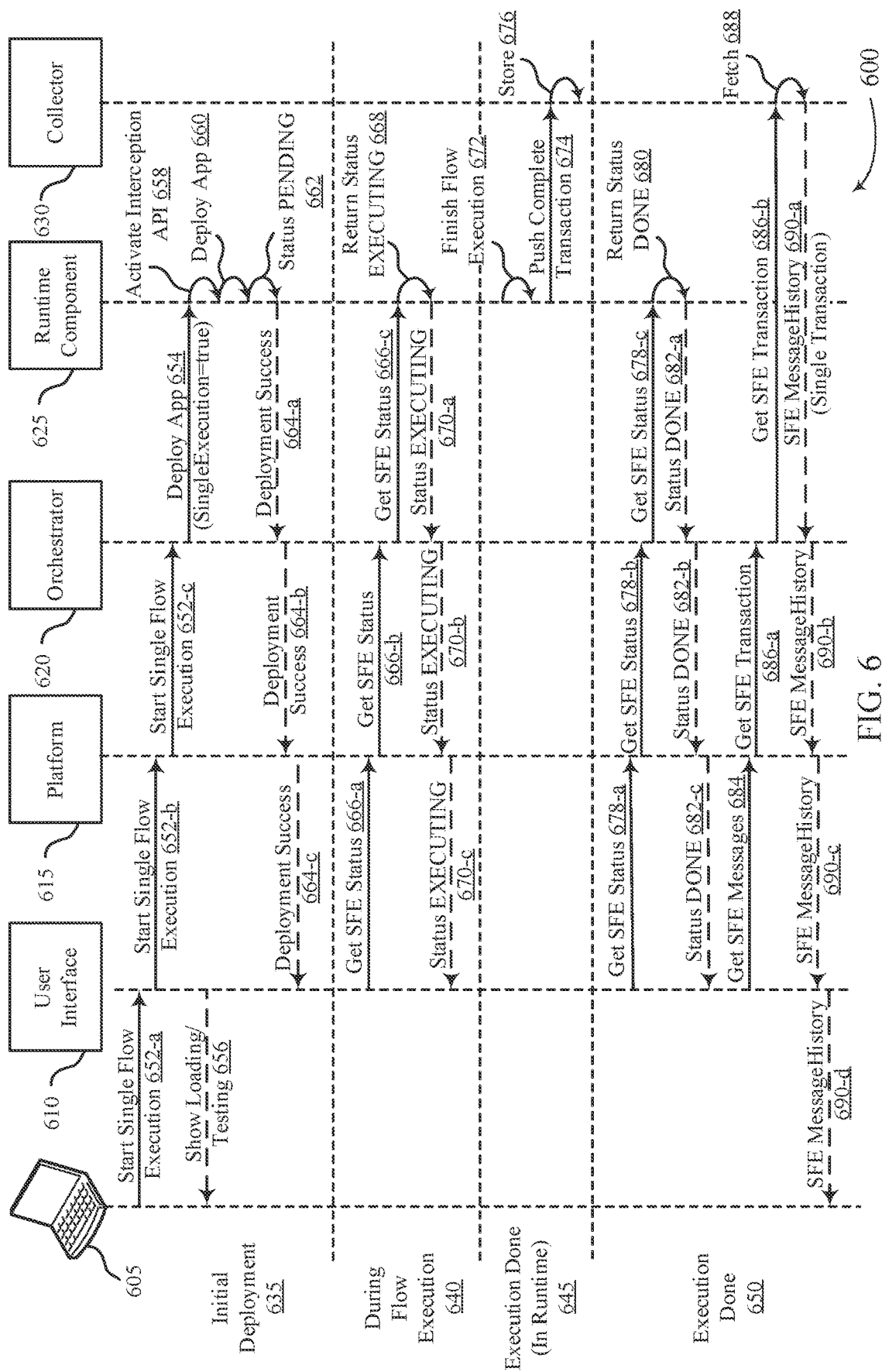
FIGS. 6 and 7 illustrate examples of process flows that support SFE in accordance with aspects of the present disclosure.

FIG. 6 illustrates an example of a process flow 600 that supports SFE in accordance with aspects of the present disclosure. In some examples, process flow 600 may implement aspects of architecture diagram 200, integration process 300, deployment diagram 400, and deployment diagram 500. The process flow 600 may include a user device 605, which may be an example of a user device 205 as described with reference to FIG. 2, initiating an SFE for an integration application, such as a citizen application, running in a testing mode. The user device 605 may implement a UI 610, which may interact with a platform 615, an orchestrator 620, a runtime component 625 (e.g., a citizen runtime with an MDS agent and MTS), a collector 630, or a combination thereof, which may be examples of a UI 305, a platform 315, an orchestrator 320, a runtime engine instance 335, and a collector 350 as described with reference to FIG. 3. In some cases, the application may be deployed locally at the user device 605 and the SFE may be performed locally by the user device 605. In some other cases, the application may be deployed at another device or system (e.g., a server or cloud component hosting a runtime engine instance). Alternative examples of the following may be implemented, where some processes are performed in a different order than described or are not performed. In some cases, processes may include additional features not mentioned below, or further processes may be added.

At 635, a user device 605 may perform an initial deployment of an application for executing a single flow. For example, the user device 605 may run the application in a test mode for a single flow. At 652-*a*, the user device 605 may indicate, via an input to a UI 610, to start an SFE of the application. In some examples, a user may submit a request to perform an SFE, which may trigger allocation of a runtime instance to perform the SFE for the application. At 652-*b*, the UI 610 may indicate to a platform 615 to start the SFE, and at 652-*c*, the platform 615 may indicate to an orchestrator 620 to start the SFE. At 654, the orchestrator 620 may deploy the application to a runtime component 625. The application may be deployed with a parameter set to indicate that the application deployment is for a single execution (e.g., SingleExecution=true).

In some cases, at 656, the UI 610 may show loading information, testing information, or both for the application. For example, the UI 610 may display progress information associated with deploying the application, processing a message by a flow of the application, or other information associated with the SFE to a user of the user device 605.

At 658, the runtime component 625 may activate an interception API to handle events for the SFE of the application. The interception API may manage inputs and outputs of components for the flow of the application. For example, the interception API may intercept a message received from an external source and sent to the integration flow, so as to stop a connector from receiving additional messages from the external source. The interception API may send the message to be processed by the flow and may disconnect a connector to the external source. At 660, the runtime component 625 may deploy the application to an SFE instance and, at 662, may set a status of the SFE to PENDING.

In some examples, at 664-*a*, if the application deployment is successful at the runtime component 625, the runtime component 625 may indicate to the orchestrator 620 that the deployment was successful. Similarly, at 664-*b*, the orchestrator 620 may indicate to the platform 615 that the deployment was successful. At 664-*c*, the platform 615 may indicate to the UI 610 that the deployment was successful, and, in some cases, the UI may display an indication of the deployment success to a user.

A polling source, such as a connector in communication with the runtime component 625 and an external source, may retrieve a message for processing by the application. Retrieving a message for processing by the flow may trigger the deployment of the application at 660 or may otherwise trigger execution of the message by the flow. The system may send a single message to the deployed application for processing, for example, based on the interception API identifying the message and stopping further requests for messages from a source.

The message may be an example of a data unit retrieved from a source (e.g., using a polling source), such as a data file, a data object or record, a communication message (e.g., email, SMS text message, social media post), a request or command, or any other unit of data for a system or application. The message may include a payload (e.g., the contents of the message), attributes (e.g., metadata associated with the message, the payload, or both), or a combination thereof. The application may generate an event based on receiving the message for processing by the flow. For example, if a trigger (e.g., a polling trigger fetching the message) reaches an event source of the flow, the event source may generate a single event including the message. In some cases, the event may further include other variables (e.g., event metadata to be used in the flow). In some cases, the single event may be a transaction no bigger than a threshold size, such as 2 megabytes (MB). The event may be configured for processing by the flow of the application. For example, the event may be passed from one component to the next within the flow, following the configured application logic. In some cases, the event may be immutable, such that modifications to the event during processing by the flow may create a new instance of the event.

At 640, the application may execute the flow on the event. For example, the event may be input into a first component of the flow. The event may be processed by one or more components, one or more connectors, one or more modules, or some combination thereof defined for the flow. The event may be processed by specific portions of the flow according to a defined logic of the flow, which may be based on one or more aspects of the message. In some cases, the application may include a single flow. In some other cases, the application may include one or more discrete flows, sub-flows, or some combination thereof for processing different messages. The runtime component 625 may set the status of the SFE to EXECUTING during execution of the event by the flow.

In some examples, at 666-*a*, during flow execution, the UI 610 may initiate a process to get the status of the SFE from the runtime component 625. For example, the UI 610 may request the status from the platform 615, which may request the status from the orchestrator 620 at 666-*b*, which may in turn request the status from the runtime component 625 at 666-*c*. The status may be set to a value of EXECUTING, which may mean the application is deploying, the flow is executing, or that one or more events have not been fully published. During flow execution, the requests to get the status may return EXECUTING or FAILED if the application deployment fails or execution fails. For example, at 668, the runtime component 625 may return the status of EXECUTING based on the execution of the event by the flow. At 670-*a*, the runtime component 625 may send the status of EXECUTING to the orchestrator 620, the orchestrator 620 may send the EXECUTING status to the platform 615 at 670-*b*, and the platform 615 may send the EXECUTING status to the UI 610 at 670-*c*. In some cases, the UI 610 may display the EXECUTING status to a user operating the user device 605.

At 645, the flow may complete execution of the event (e.g., in the runtime component 625). For example, at 672, the event may reach an end of a flow (or sub-flow), the execution of the flow may timeout, or the application may detect an error associated with the flow execution. The runtime component 625 may generate SFE message history for the execution and may configure the SFE message history in a single transaction. In some cases, the SFE message history may be associated with metadata for the execution. For example, the SFE message history may include information related to the processing of the event throughout the flow, including timestamps associated with processing at each portion of the flow, processing resources associated with processing at each portion of the flow, values or parameters associated with the event (e.g., the message payload) at different stages of the flow, success or failure indications for different stages of the flow, errors detected during processing, or any combination thereof. At 674, the runtime component 625 may push a complete transaction (e.g., including the SFE message history) to the collector 630 for storage by the collector 630 (e.g., in a database, a testing log, or other memory resources). At 676, the collector 630 may store the transaction, such that the transaction is accessible to a user (e.g., a user designing, customizing, or otherwise modifying or evaluating the flow).

At 650, the SFE for the application may be complete (e.g., based on storing the transaction information at the collector 630). In some cases, the UI 610 may initiate a process to get the status of the SFE from the runtime component 625. For example, at 678-*a*, the UI 610 may request the status from the platform 615, which may request the status from the orchestrator 620 at 678-*b*, which may in turn request the status from the runtime component 625 at 678-*c*. The status may be set to a value of DONE based on completing the SFE for the application. For example, at 680, the runtime component 625 may return the status of DONE. At 682-*a*, the runtime component 625 may send the status of DONE to the orchestrator 620, the orchestrator 620 may send the DONE status to the platform 615 at 682-*b*, and the platform 615 may send the DONE status to the UI 610 at 682-*c*. In some cases, the UI 610 may display the DONE status to a user operating the user device 605. The orchestrator 620 may stop the application and undeploy the application from the runtime component 625 based on completing execution of the SFE for the application. The resources associated with the runtime component 625 may be released. However, the results of the SFE may be persisted (e.g., in the transaction stored by the collector 630).

At 684, the UI 610 may request one or more SFE messages from the platform 615, for example, to analyze the processing of the message by the flow of the application. At 686-*a*, the platform 615 may request an SFE transaction from the orchestrator 620, and at 686-*b* the orchestrator 620 may request the SFE transaction from the collector 630. At 688, the collector 630 may fetch the transaction from storage and, at 690-*a*, may return an SFE message history of the single transaction to the orchestrator 620. At 690-*b*, the orchestrator 620 may send the SFE message history to the platform 615, and at 690-*c* the platform 615 may send the SFE message history to the UI 610.

At 690-*d*, the user device 605 may display the results of the SFE for the application (e.g., the SFE message history) to a user operating the user device 605 via the UI 610. Accordingly, the user may analyze how the single message was processed by the flow. In some cases, the user may modify the application, the flow, or both based on the SFE message history. For example, if the flow included one or more errors, the errors may affect a single message, and the user may view the information related to the message processing and may correct the errors (e.g., in a design session). In some cases, the user may perform one or more additional SFE tests to further test the flow of the application. The system may avoid processing multiple messages that are negatively affected by the same errors within the flow based on the SFE service (e.g., by refraining from sending batches of messages to the flow and refraining from parallelizing execution of the flow on multiple messages).

Figure 7:
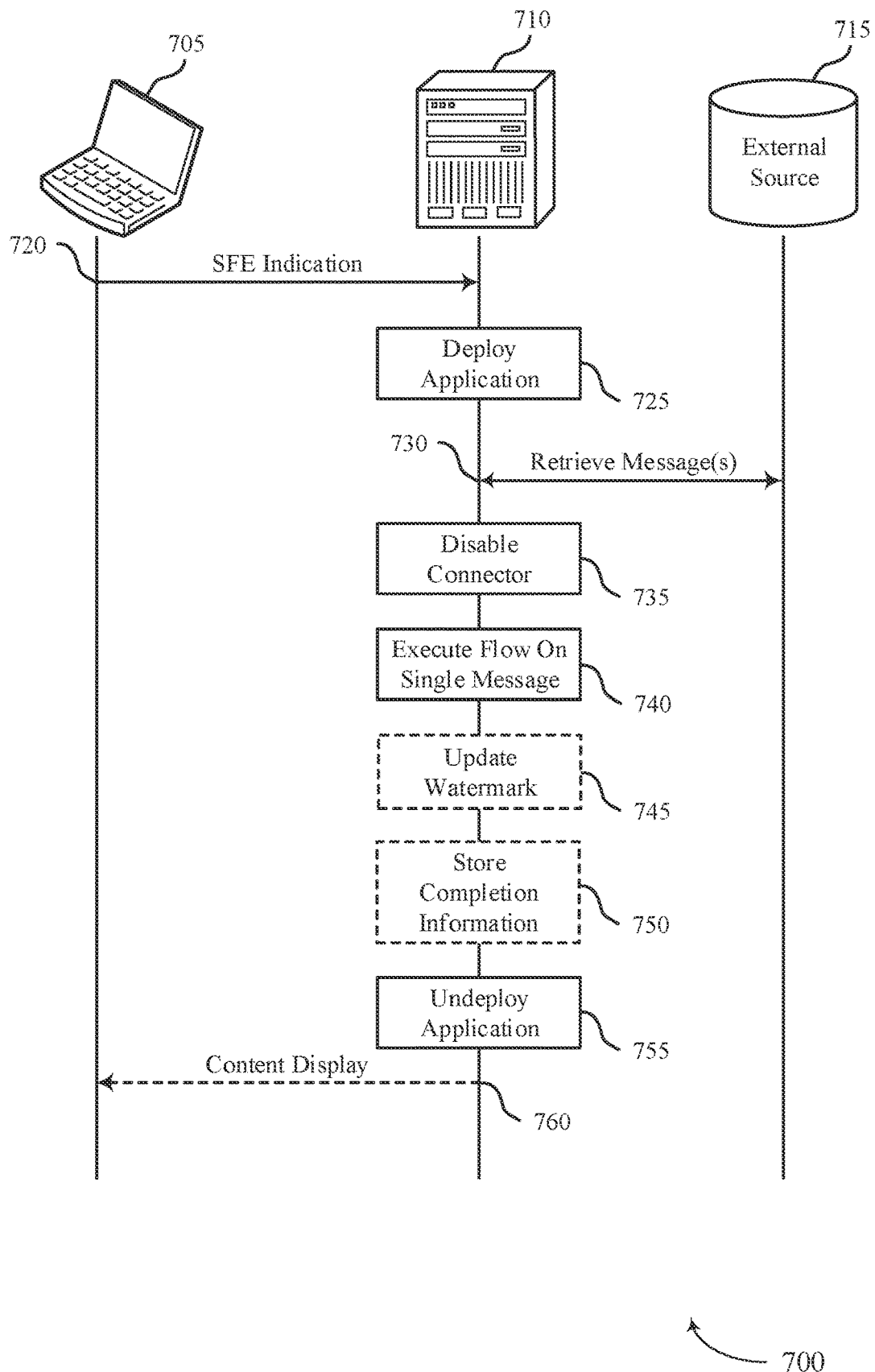

FIG. 7 illustrates an example of a process flow 700 that supports SFE in accordance with aspects of the present disclosure. In some examples, process flow 700 may implement aspects of architecture diagram 200, integration process 300, deployment diagram 400, deployment diagram 500, and process flow 600. The process flow 700 may include a user device 705, which may be an example of a user device 205 as described with reference to FIG. 2, initiating an SFE for an integration application implemented at a processing component 710, such as a citizen application. The processing component 710 may access one or more messages from an external source 715, which may be examples of a processing component 210 and an external source 230 as described with reference to FIG. 2. Alternative examples of the following may be implemented, where some processes are performed in a different order than described or are not performed. In some cases, processes may include additional features not mentioned below, or further processes may be added.

At 720, a user device 705 may send an indication to run an SFE for an application to the processing component 710. The application may include one or more components, one or more connectors, one or more modules, or a combination thereof organized into a flow. In some cases, the application may integrate one or more different services. The connectors may connect the user device 705, the processing component 710, and the external source 715, such that these devices, components, and systems may communicate data or other information with each other. In some examples, there may be different types of connectors, such as a database connector, a service or application specific connector, or the like. In some cases, the processing component 710 may receive a user input from a user interface of the user device 705. The user input may indicate a definition for the application. Additionally or alternatively, the processing component 710 may receive a user input including an indication to run the SFE for the application.

In some examples, the processing component 710 may receive the indication to run the SFE for the application at an orchestrator. The orchestrator may send the application and an indication of the SFE to a cluster controller and may select a runtime engine instance from a cluster of runtime engine instances. In some cases, the cluster controller may call one or more endpoints to execute the SFE, where the application is deployed to the selected runtime engine instance based on calling the one or more endpoints.

At 725, the processing component 710 may deploy the application into a runtime engine instance in response to the indication to run the SFE. In some examples, at 730, the processing component 710 may retrieve one or more messages from an external source 715. For example, the processing component 710 may use a polling source, including a connector, to retrieve the one or more messages based on a polling trigger for the deployed application. In some cases, the polling trigger may be a frequency. The processing component 710 may execute the polling source based on the frequency by connecting to the external source 715 and querying new data (e.g., the messages). In some examples, the polling source may track a watermark for the external source 715 and may retrieve messages based on the watermark (e.g., a current value of the watermark). For example, if the watermark indicates a timestamp, the polling source may retrieve a message stored at the external source 715 corresponding to a next timestamp. In some cases, the processing component 710 may update the watermark to indicate the next timestamp (e.g., based on retrieving the message or based on processing the message by the flow). If the connector retrieves a batch of messages, the processing component 710 may update the watermark based on a single message of the batch of messages processed by the flow and may not update the watermark based on the other messages in the batch of messages. Accordingly, the processing component 710 may effectively track which messages from the external source 715 have been processed by the flow during the SFE. If the connector retrieves a batch of messages, the additional, unprocessed messages may be stored for later processing (e.g., during a subsequent SFE) or may be removed from memory when the application is undeployed. Once the processing component 710 retrieves one or more messages from the external source 715, at 735, the processing component 710 may disable the connector.

At 740, the processing component 710 may execute the flow for the deployed application on a single message of the one or more messages. For example, the processing component 710 may generate an event including the single message and metadata associated with the event. The processing component 710 may modify the event based on the one or more components and a logical order of the flow and may determine a result of the completion of executing the flow based on the modified event. In some cases, the single message may include a single data object, a single email message, a single SMS text message, a single voice call, or a single document.

As described herein, at 745, the processing component 710 may update the watermark (e.g., based on a timestamp, an incremental value, or both) to indicate that the single message was processed by the flow for the deployed application based on the completion of executing the flow. In some cases, the processing component 710 may persist the watermark external to the runtime engine instance (e.g., at a collector, a polling source, or other storage component).

At 750, the processing component 710 may store information at a collector. The information may be related to the completion of executing the flow for the deployed application on the single message. In some cases, the information may include transaction data resulting from executing the flow, one or more log messages generated from executing the flow, or both.

At 755, the processing component 710 may undeploy the application from the runtime engine instance based on a completion of executing the flow for the deployed application on the single message. For example, the processing component 710 may stop the application based on executing the flow. Once the application is stopped, the processing component 710 may release the runtime engine instance based on undeploying the application from the runtime engine instance at 755. In some cases, the processing component 710 may detect the completion of executing the flow at a plugin and may invoke an application service using the plugin. In some examples, the completion of executing the flow may include the single message completing processing by each component of the flow, the single message completing processing by each component of a sub-flow of the flow based on a logical order of the flow, the executing the flow for the deployed application on the single message resulting in an execution failure, a time duration for executing the flow for the deployed application on the single message satisfying a timeout criterion, receiving a user request to stop executing the flow for the deployed application on the single message, or a combination thereof. The application may be undeployed subsequent to storing the information at the collector.

At 760, the processing component 710 may send the information related to the completion of executing the flow for display at a user interface of the user device 705.

Figure 8:
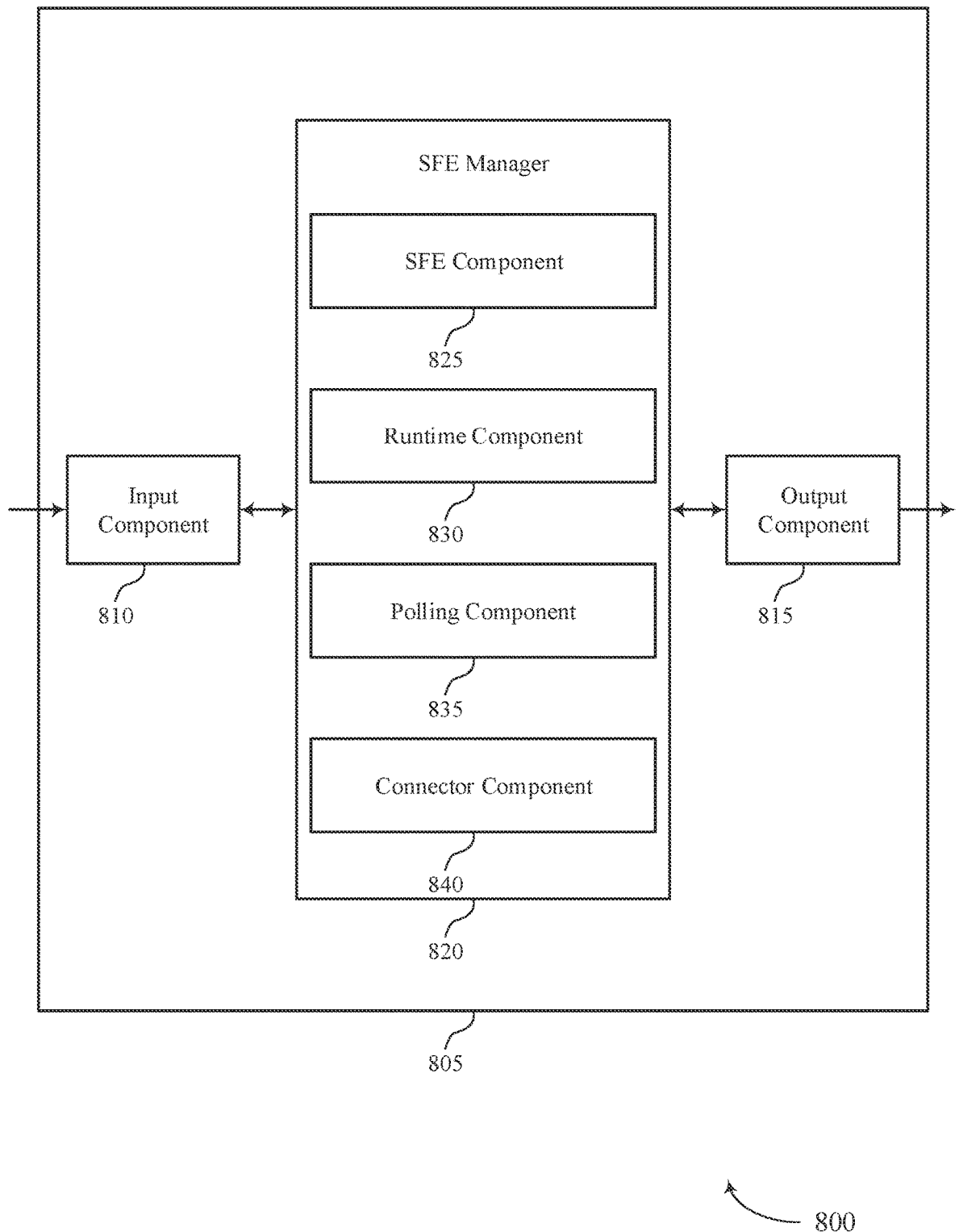
FIG. 8 shows a block diagram of an apparatus that supports SFE in accordance with aspects of the present disclosure.

FIG. 8 shows a block diagram 800 of an apparatus 805 that supports SFE in accordance with aspects of the present disclosure. The apparatus 805 may include an input component 810, an output component 815, and an SFE manager 820. The apparatus 805 may also include a processor. Each of these components may be in communication with one another (e.g., via one or more buses). In some cases, the apparatus 805 may be an example of a processing component (e.g., a user device, a server, a server cluster, a virtual machine, a cloud-based server, a container, or any other system or device supporting data processing).

The input component 810 may manage input signals for the apparatus 805. For example, the input component 810 may identify input signals based on an interaction with a modem, a keyboard, a mouse, a touchscreen, or a similar device. These input signals may be associated with user input or processing at other components or devices. In some cases, the input component 810 may utilize an operating system such as iOS®, ANDROID®, MS-DOS®, MS-WINDOWS®, OS/2®, UNIX®, LINUX®, or another known operating system to handle input signals. The input component 810 may send aspects of these input signals to other components of the apparatus 805 for processing. For example, the input component 810 may transmit input signals to the SFE manager 820 to support SFE. In some cases, the input component 810 may be a component of an input/output (I/O) controller 1010 as described with reference to FIG. 10.

The output component 815 may manage output signals for the apparatus 805. For example, the output component 815 may receive signals from other components of the apparatus 805, such as the SFE manager 820, and may transmit these signals to other components or devices. In some specific examples, the output component 815 may transmit output signals for display in a user interface, for storage in a database or data store, for further processing at a server or server cluster, or for any other processes at any number of devices or systems. In some cases, the output component 815 may be a component of an I/O controller 1010 as described with reference to FIG. 10.

For example, the SFE manager 820 may include an SFE component 825, a runtime component 830, a polling component 835, a connector component 840, or any combination thereof. In some examples, the SFE manager 820, or various components thereof, may be configured to perform various operations (e.g., receiving, monitoring, transmitting) using or otherwise in cooperation with the input component 810, the output component 815, or both. For example, the SFE manager 820 may receive information from the input component 810, send information to the output component 815, or be integrated in combination with the input component 810, the output component 815, or both to receive information, transmit information, or perform various other operations as described herein.

The SFE manager 820 may support SFE in accordance with examples as disclosed herein. The SFE component 825 may be configured as or otherwise support a means for receiving an indication to run an SFE for an application comprising one or more components, one or more connectors, one or more modules, or a combination thereof organized into a flow. The runtime component 830 may be configured as or otherwise support a means for deploying the application into a runtime engine instance in response to the indication to run the SFE. The polling component 835 may be configured as or otherwise support a means for retrieving, using a polling source, one or more messages from an external source via a connector based at least in part on a polling trigger for the deployed application. The connector component 840 may be configured as or otherwise support a means for disabling the connector to the external source based at least in part on retrieving the one or more messages. The SFE component 825 may be configured as or otherwise support a means for executing the flow for the deployed application on a single message of the one or more messages based at least in part on the indication to run the SFE. The runtime component 830 may be configured as or otherwise support a means for undeploying the application from the runtime engine instance based at least in part on a completion of executing the flow for the deployed application on the single message.

Figure 9:
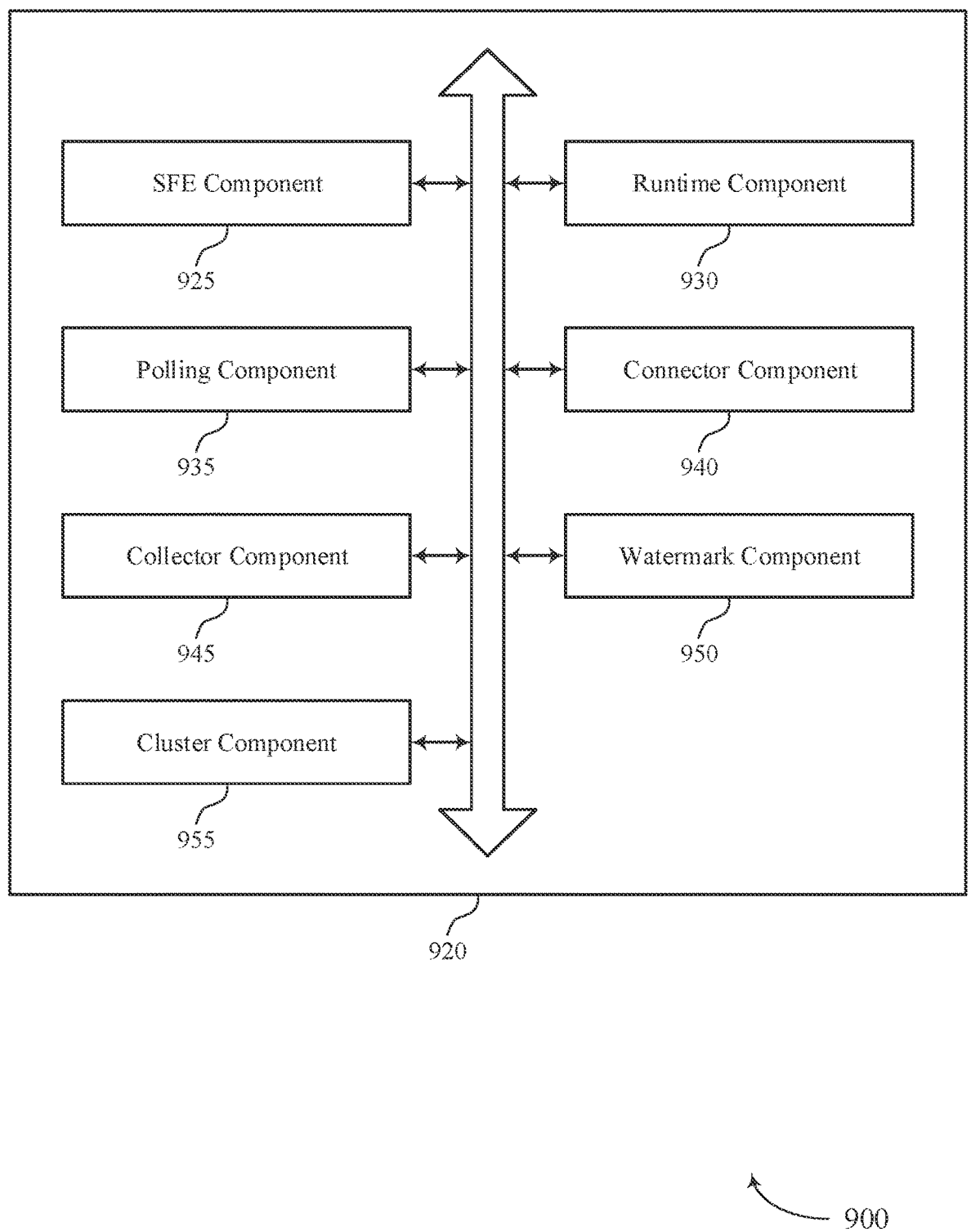
FIG. 9 shows a block diagram of an SFE manager that supports SFE in accordance with aspects of the present disclosure.

FIG. 9 shows a block diagram 900 of an SFE manager 920 that supports SFE in accordance with aspects of the present disclosure. The SFE manager 920 may be an example of aspects of a processing component, a processing system, or an SFE manager 820, as described herein. The SFE manager 920, or various components thereof, may be an example of means for performing various aspects of SFE as described herein. For example, the SFE manager 920 may include an SFE component 925, a runtime component 930, a polling component 935, a connector component 940, a collector component 945, a watermark component 950, a cluster component 955, or any combination thereof. Each of these components may communicate, directly or indirectly, with one another (e.g., via one or more buses).

The SFE manager 920 may support SFE in accordance with examples as disclosed herein. The SFE component 925 may be configured as or otherwise support a means for receiving an indication to run an SFE for an application comprising one or more components, one or more connectors, one or more modules, or a combination thereof organized into a flow. The runtime component 930 may be configured as or otherwise support a means for deploying the application into a runtime engine instance in response to the indication to run the SFE. The polling component 935 may be configured as or otherwise support a means for retrieving, using a polling source, one or more messages from an external source via a connector based at least in part on a polling trigger for the deployed application. The connector component 940 may be configured as or otherwise support a means for disabling the connector to the external source based at least in part on retrieving the one or more messages. In some examples, the SFE component 925 may be configured as or otherwise support a means for executing the flow for the deployed application on a single message of the one or more messages based at least in part on the indication to run the SFE. In some examples, the runtime component 930 may be configured as or otherwise support a means for undeploying the application from the runtime engine instance based at least in part on a completion of executing the flow for the deployed application on the single message.

In some examples, the collector component 945 may be configured as or otherwise support a means for storing, at a collector, information related to the completion of executing the flow for the deployed application on the single message, wherein the application is undeployed subsequent to storing the information at the collector.

In some examples, the information comprises transaction data resulting from executing the flow, one or more log messages generated from executing the flow, or both.

In some examples, the collector component 945 may be configured as or otherwise support a means for sending, for display at a UI of a user device, the information related to the completion of executing the flow for the deployed application on the single message.

In some examples, the SFE component 925 may be configured as or otherwise support a means for receiving, from a UI of a user device, a first user input indicating a definition for the application, a second user input comprising the indication to run the SFE for the application, or both.

In some examples, the watermark component 950 may be configured as or otherwise support a means for updating a watermark to indicate that the single message was processed by the flow for the deployed application based at least in part on the completion of executing the flow for the deployed application on the single message.

In some examples, the watermark component 950 may be configured as or otherwise support a means for persisting the watermark external to the runtime engine instance. In some examples, the one or more messages are retrieved from the external source based at least in part on a current value of the watermark. In some examples, the watermark comprises a timestamp, an incremental value, or both.

In some examples, the polling trigger comprises a frequency, and the polling component 935 may be configured as or otherwise support a means for executing the polling source according to the frequency. In some examples, to execute the polling source, the connector component 940 may be configured as or otherwise support a means for connecting to the external source via the connector and the polling component 935 may be configured as or otherwise support a means for querying new data from the external source, wherein the one or more messages are retrieved in response to the querying.

In some examples, the polling source tracks a watermark for the external source. In some examples, the querying the new data comprises querying for data stored at the external source subsequent to the watermark for the external source.

In some examples, the SFE component 925 may be configured as or otherwise support a means for stopping the application based at least in part on executing the flow for the deployed application on the single message. In some examples, the runtime component 930 may be configured as or otherwise support a means for releasing the runtime engine instance based at least in part on undeploying the application from the runtime engine instance.

In some examples, the SFE component 925 may be configured as or otherwise support a means for detecting, at a plugin, the completion of executing the flow for the deployed application on the single message. In some examples, the runtime component 930 may be configured as or otherwise support a means for invoking, using the plugin, an application service, wherein the application is undeployed from the runtime engine instance based at least in part on invoking the application service.

In some examples, to support executing the flow for the deployed application on the single message, the SFE component 925 may be configured as or otherwise support a means for generating an event comprising the single message and metadata associated with the event. In some examples, to support executing the flow for the deployed application on the single message, the SFE component 925 may be configured as or otherwise support a means for modifying the event based at least in part on the one or more components and a logical order of the flow. In some examples, to support executing the flow for the deployed application on the single message, the SFE component 925 may be configured as or otherwise support a means for determining a result of the completion of executing the flow for the deployed application on the single message based at least in part on the modified event.

In some examples, the indication to run the SFE for the application is received at an orchestrator, and the cluster component 955 may be configured as or otherwise support a means for sending, by the orchestrator, the application and an indication of the SFE to a cluster controller. In some examples, the indication to run the SFE for the application is received at an orchestrator, and the cluster component 955 may be configured as or otherwise support a means for selecting, by the cluster controller, the runtime engine instance from a cluster of runtime engine instances. In some examples, the indication to run the SFE for the application is received at an orchestrator, and the cluster component 955 may be configured as or otherwise support a means for calling, by the cluster controller, one or more endpoints to execute the SFE, wherein the application is deployed to the selected runtime engine instance based at least in part on calling the one or more endpoints.

In some examples, the completion of executing the flow for the deployed application on the single message comprises the single message completing processing by each component of the one or more components of the flow, the single message completing processing by each component of a sub-flow of the flow based at least in part on a logical order of the flow, the executing the flow for the deployed application on the single message resulting in an execution failure, a time duration for executing the flow for the deployed application on the single message satisfying a timeout criterion, receiving a user request to stop executing the flow for the deployed application on the single message, or a combination thereof.

In some examples, the single message comprises a single data object, a single email message, a single SMS text message, a single voice call, or a single document.

Figure 10:
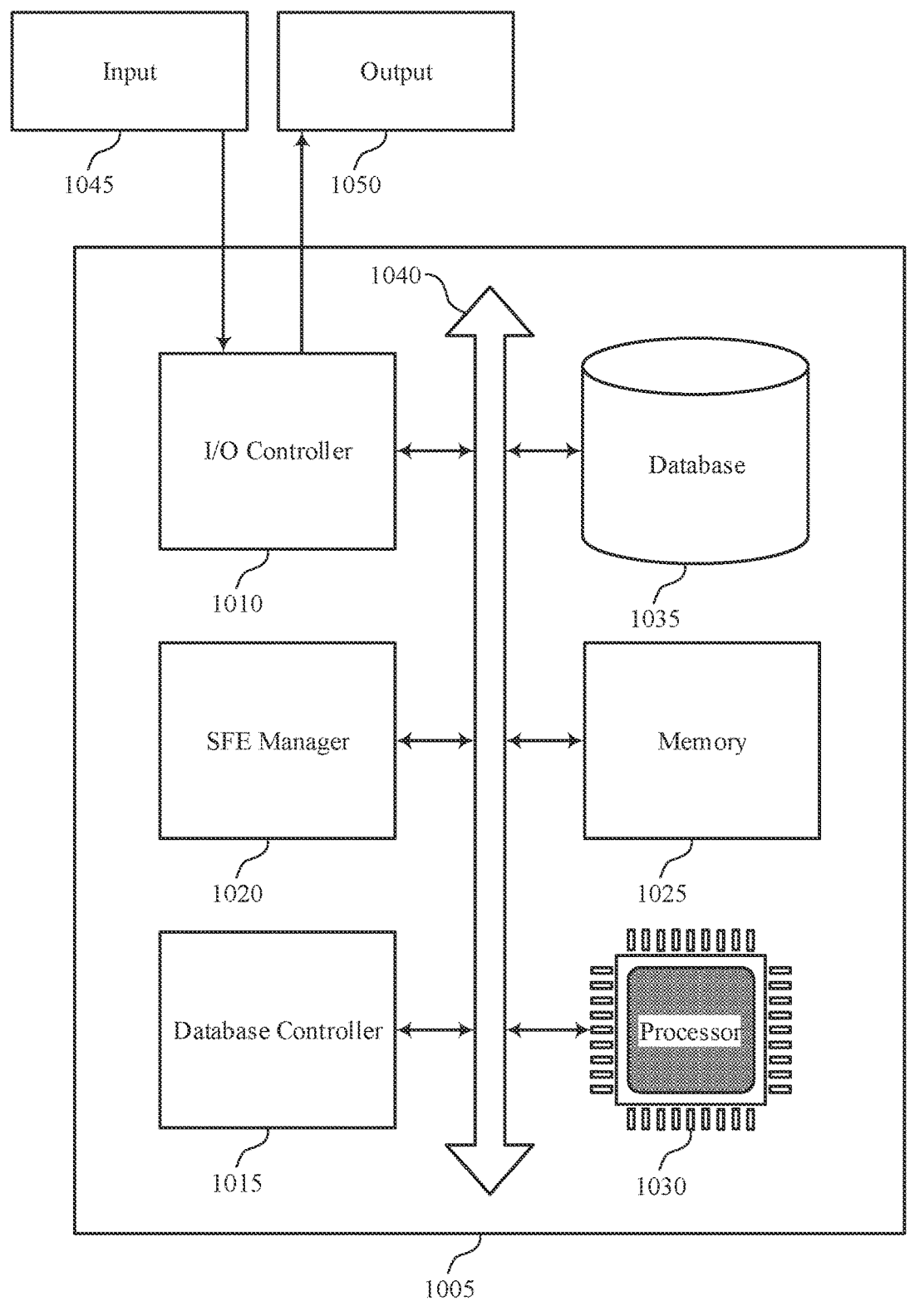
FIG. 10 shows a diagram of a system including a device that supports SFE in accordance with aspects of the present disclosure.

FIG. 10 shows a diagram of a system 1000 including a device 1005 that supports SFE in accordance with aspects of the present disclosure. The device 1005 may be an example of or include the components of an apparatus 805 as described herein. The device 1005 may include components for bi-directional data communications including components for transmitting and receiving communications, such as an SFE manager 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor. In some cases, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a digital signaling processor (DSP), a central processing unit (CPU), a microcontroller, an application-specific integrated circuit (ASIC), a field-programmable gate-array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting SFE).

The SFE manager 1020 may support SFE in accordance with examples as disclosed herein. For example, the SFE manager 1020 may be configured as or otherwise support a means for receiving an indication to run an SFE for an application comprising one or more components, one or more connectors, one or more modules, or a combination thereof organized into a flow. The SFE manager 1020 may be configured as or otherwise support a means for deploying the application into a runtime engine instance in response to the indication to run the SFE. The SFE manager 1020 may be configured as or otherwise support a means for retrieving, using a polling source, one or more messages from an external source via a connector based at least in part on a polling trigger for the deployed application. The SFE manager 1020 may be configured as or otherwise support a means for disabling the connector to the external source based at least in part on retrieving the one or more messages. The SFE manager 1020 may be configured as or otherwise support a means for executing the flow for the deployed application on a single message of the one or more messages based at least in part on the indication to run the SFE. The SFE manager 1020 may be configured as or otherwise support a means for undeploying the application from the runtime engine instance based at least in part on a completion of executing the flow for the deployed application on the single message.

By including or configuring the SFE manager 1020 in accordance with examples as described herein, the device 1005 may support techniques for performing an SFE for a message, which may improve data analytics and mitigate interference and complexities due to processing multiple messages, among other benefits.

Figure 11:
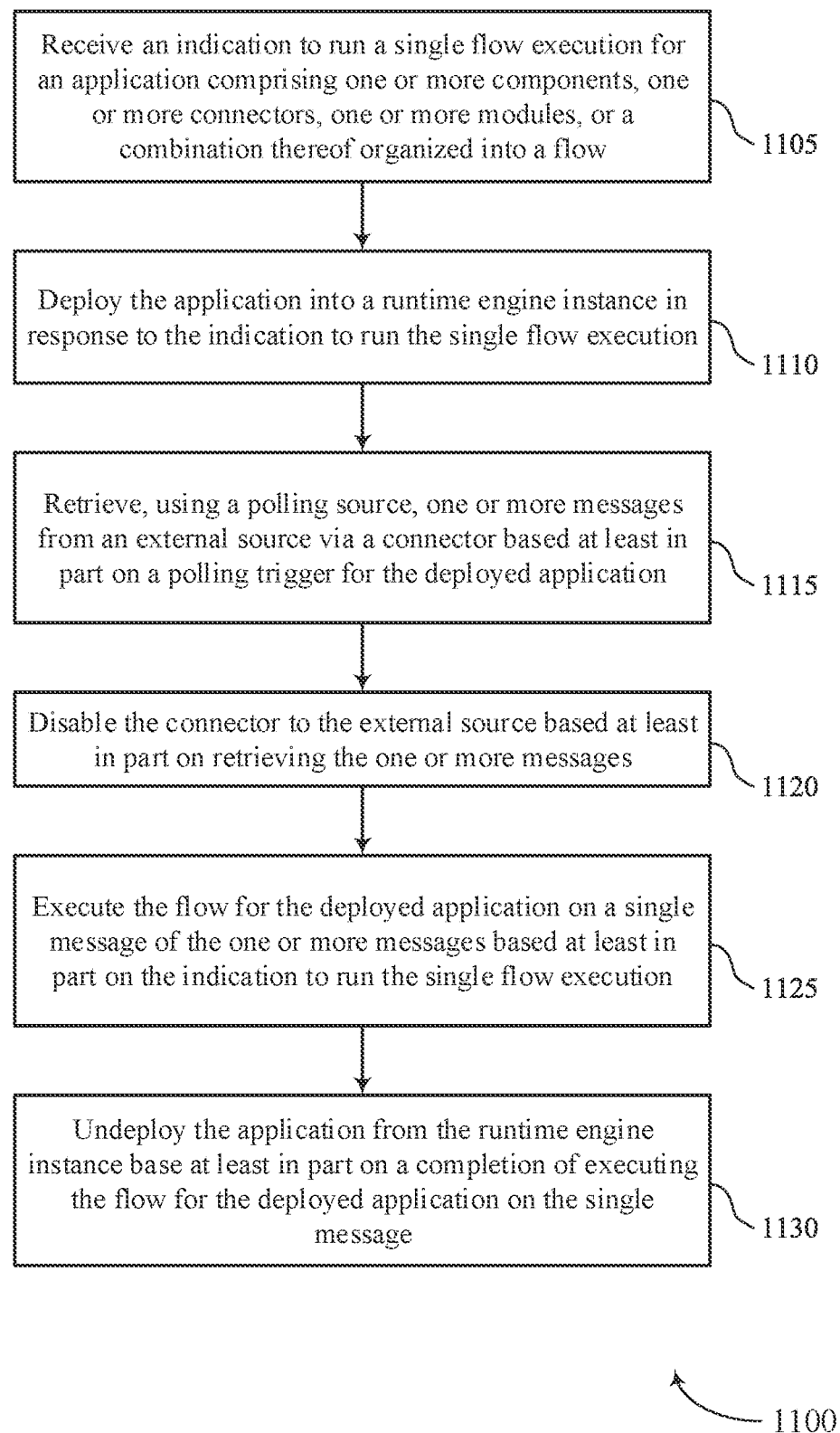
FIGS. 11 through 13 show flowcharts illustrating methods that support SFE in accordance with aspects of the present disclosure.

FIG. 11 shows a flowchart illustrating a method 1100 that supports SFE in accordance with aspects of the present disclosure. The operations of the method 1100 may be implemented by a processing component (e.g., including an SFE manager) or its components as described herein. The processing component may be an example of a user device, a server, a server cluster, a virtual machine, a cloud-based server, a container, or any other system or device supporting data processing. For example, the operations of the method 1100 may be performed by a processing component as described with reference to FIGS. 1 through 10. In some examples, a processing component may execute a set of instructions to control the functional elements of the processing component to perform the described functions. Additionally or alternatively, the processing component may perform aspects of the described functions using special-purpose hardware.

At 1105, the method may include receiving an indication to run an SFE for an application comprising one or more components, one or more connectors, one or more modules, or a combination thereof organized into a flow. The operations of 1105 may be performed in accordance with examples as disclosed herein. In some examples, aspects of the operations of 1105 may be performed by an SFE component 925 as described with reference to FIG. 9.

At 1110, the method may include deploying the application into a runtime engine instance in response to the indication to run the SFE. The operations of 1110 may be performed in accordance with examples as disclosed herein. In some examples, aspects of the operations of 1110 may be performed by a runtime component 930 as described with reference to FIG. 9.

At 1115, the method may include retrieving, using a polling source, one or more messages from an external source via a connector based at least in part on a polling trigger for the deployed application. The operations of 1115 may be performed in accordance with examples as disclosed herein. In some examples, aspects of the operations of 1115 may be performed by a polling component 935 as described with reference to FIG. 9.

At 1120, the method may include disabling the connector to the external source based at least in part on retrieving the one or more messages. The operations of 1120 may be performed in accordance with examples as disclosed herein.

In some examples, aspects of the operations of 1120 may be performed by a connector component 940 as described with reference to FIG. 9.

At 1125, the method may include executing the flow for the deployed application on a single message of the one or more messages based at least in part on the indication to run the SFE. The operations of 1125 may be performed in accordance with examples as disclosed herein. In some examples, aspects of the operations of 1125 may be performed by an SFE component 925 as described with reference to FIG. 9.

At 1130, the method may include undeploying the application from the runtime engine instance based at least in part on a completion of executing the flow for the deployed application on the single message. The operations of 1130 may be performed in accordance with examples as disclosed herein. In some examples, aspects of the operations of 1130 may be performed by a runtime component 930 as described with reference to FIG. 9.

Figure 12:
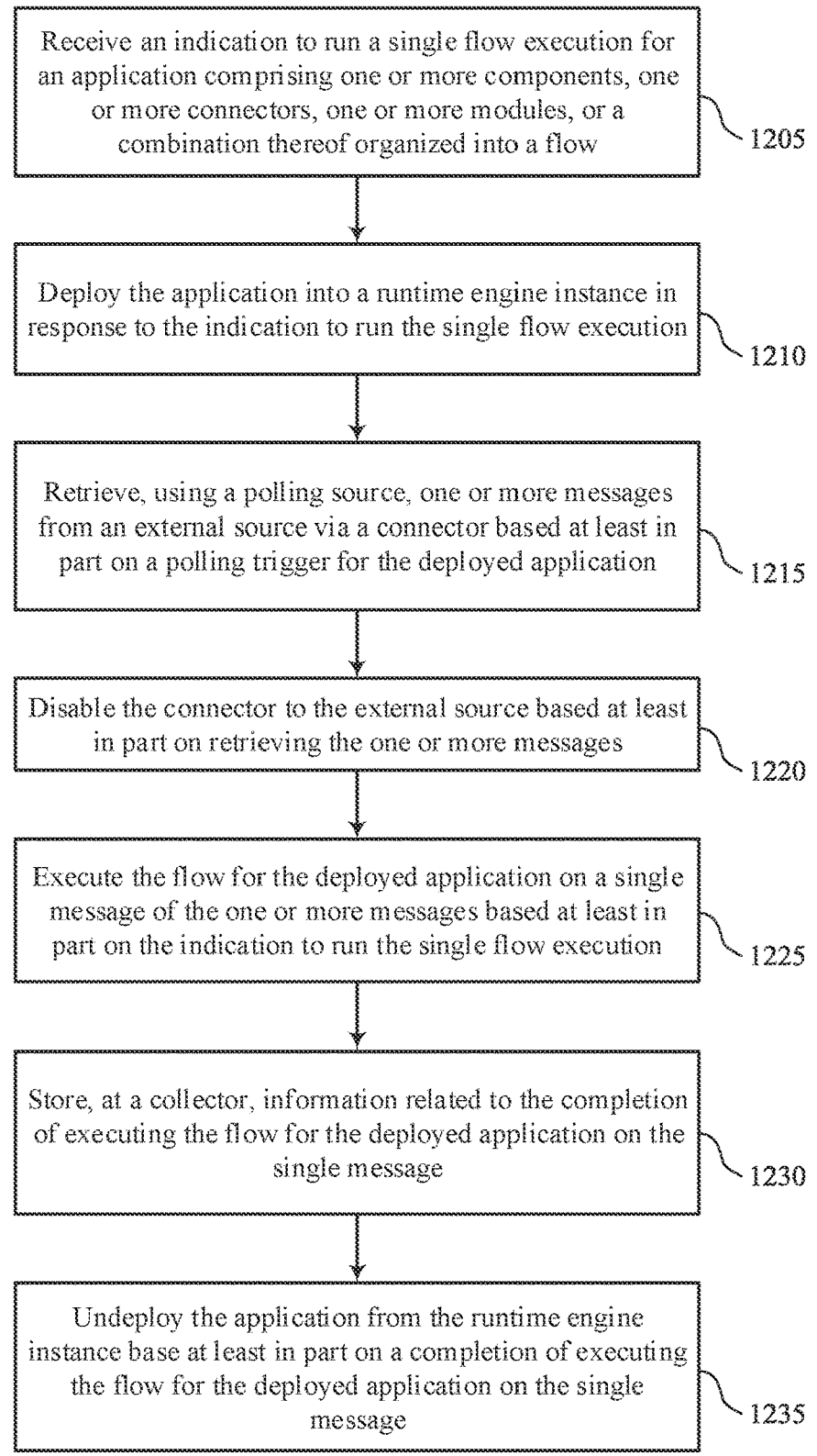

FIG. 12 shows a flowchart illustrating a method 1200 that supports SFE in accordance with aspects of the present disclosure. The operations of the method 1200 may be implemented by a processing component (e.g., including an SFE manager) or its components as described herein. For example, the operations of the method 1200 may be performed by a processing component as described with reference to FIGS. 1 through 10. In some examples, a processing component may execute a set of instructions to control the functional elements of the processing component to perform the described functions. Additionally or alternatively, the processing component may perform aspects of the described functions using special-purpose hardware.

At 1205, the method may include receiving an indication to run an SFE for an application comprising one or more components, one or more connectors, one or more modules, or a combination thereof organized into a flow. The operations of 1205 may be performed in accordance with examples as disclosed herein. In some examples, aspects of the operations of 1205 may be performed by an SFE component 925 as described with reference to FIG. 9.

At 1210, the method may include deploying the application into a runtime engine instance in response to the indication to run the SFE. The operations of 1210 may be performed in accordance with examples as disclosed herein. In some examples, aspects of the operations of 1210 may be performed by a runtime component 930 as described with reference to FIG. 9.

At 1215, the method may include retrieving, using a polling source, one or more messages from an external source via a connector based at least in part on a polling trigger for the deployed application. The operations of 1215 may be performed in accordance with examples as disclosed herein. In some examples, aspects of the operations of 1215 may be performed by a polling component 935 as described with reference to FIG. 9.

At 1220, the method may include disabling the connector to the external source based at least in part on retrieving the one or more messages. The operations of 1220 may be performed in accordance with examples as disclosed herein. In some examples, aspects of the operations of 1220 may be performed by a connector component 940 as described with reference to FIG. 9.

At 1225, the method may include executing the flow for the deployed application on a single message of the one or more messages based at least in part on the indication to run the SFE. The operations of 1225 may be performed in accordance with examples as disclosed herein. In some examples, aspects of the operations of 1225 may be performed by an SFE component 925 as described with reference to FIG. 9.

At 1230, the method may include storing, at a collector, information related to the completion of executing the flow for the deployed application on the single message. The operations of 1230 may be performed in accordance with examples as disclosed herein. In some examples, aspects of the operations of 1230 may be performed by a collector component 945 as described with reference to FIG. 9.

At 1235, the method may include undeploying the application from the runtime engine instance based at least in part on a completion of executing the flow for the deployed application on the single message. The application may be undeployed subsequent to storing the information at the collector. The operations of 1235 may be performed in accordance with examples as disclosed herein. In some examples, aspects of the operations of 1235 may be performed by a runtime component 930 as described with reference to FIG. 9.

Figure 13:
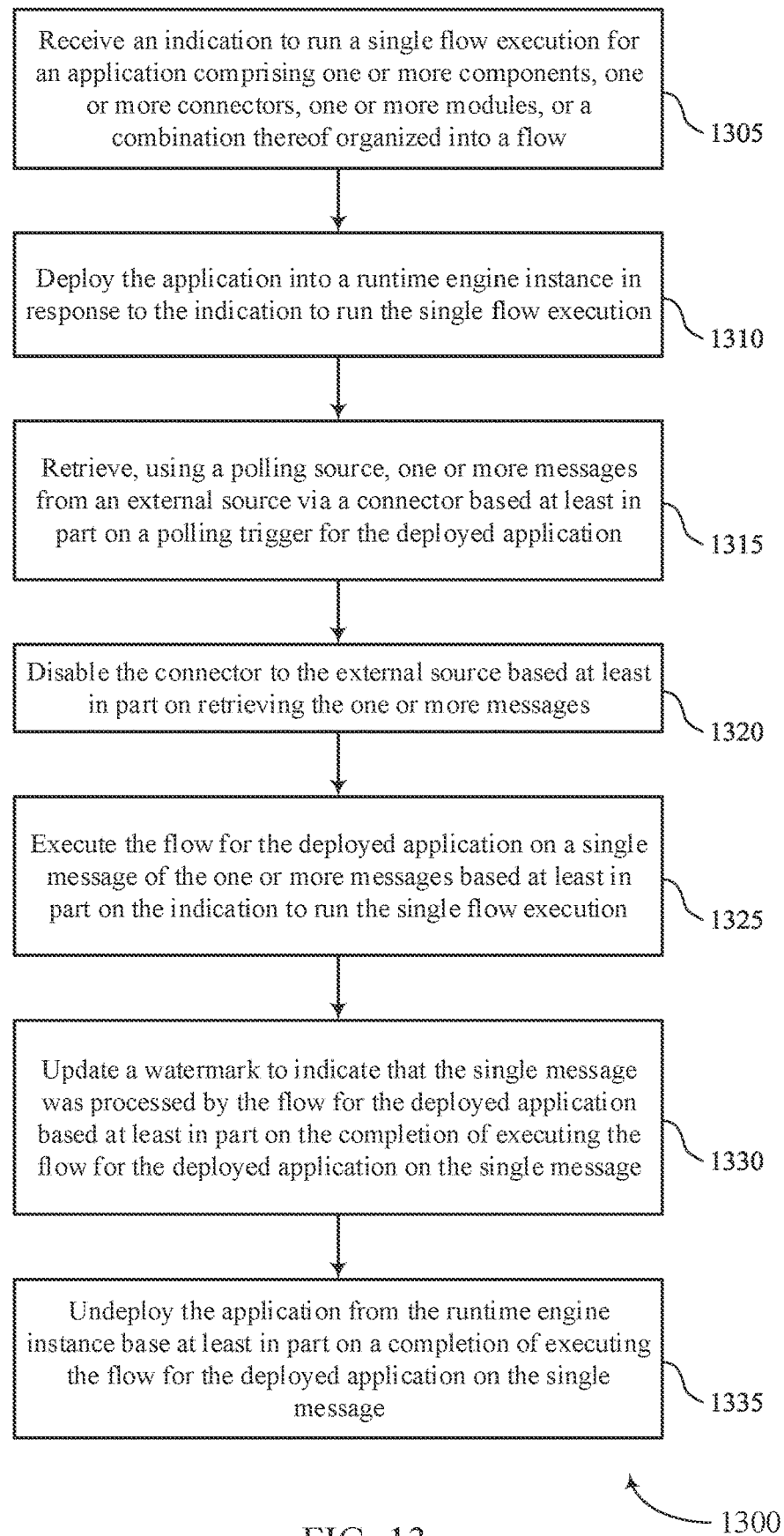

FIG. 13 shows a flowchart illustrating a method 1300 that supports SFE in accordance with aspects of the present disclosure. The operations of the method 1300 may be implemented by a processing component or its components as described herein. For example, the operations of the method 1300 may be performed by a processing component as described with reference to FIGS. 1 through 10. In some examples, a processing component may execute a set of instructions to control the functional elements of the processing component to perform the described functions. Additionally or alternatively, the processing component may perform aspects of the described functions using special-purpose hardware.

At 1305, the method may include receiving an indication to run an SFE for an application comprising one or more components, one or more connectors, one or more modules, or a combination thereof organized into a flow. The operations of 1305 may be performed in accordance with examples as disclosed herein. In some examples, aspects of the operations of 1305 may be performed by an SFE component 925 as described with reference to FIG. 9.

At 1310, the method may include deploying the application into a runtime engine instance in response to the indication to run the SFE. The operations of 1310 may be performed in accordance with examples as disclosed herein. In some examples, aspects of the operations of 1310 may be performed by a runtime component 930 as described with reference to FIG. 9.

At 1315, the method may include retrieving, using a polling source, one or more messages from an external source via a connector based at least in part on a polling trigger for the deployed application. The messages may be retrieved according to a current value of a watermark. The operations of 1315 may be performed in accordance with examples as disclosed herein. In some examples, aspects of the operations of 1315 may be performed by a polling component 935 as described with reference to FIG. 9.

At 1320, the method may include disabling the connector to the external source based at least in part on retrieving the one or more messages. The operations of 1320 may be performed in accordance with examples as disclosed herein. In some examples, aspects of the operations of 1320 may be performed by a connector component 940 as described with reference to FIG. 9.

At 1325, the method may include executing the flow for the deployed application on a single message of the one or more messages based at least in part on the indication to run the SFE. The operations of 1325 may be performed in accordance with examples as disclosed herein. In some examples, aspects of the operations of 1325 may be performed by an SFE component 925 as described with reference to FIG. 9.

At 1330, the method may include updating the watermark to indicate that the single message was processed by the flow for the deployed application based at least in part on the completion of executing the flow for the deployed application on the single message. The operations of 1330 may be performed in accordance with examples as disclosed herein. In some examples, aspects of the operations of 1330 may be performed by a watermark component 950 as described with reference to FIG. 9.

At 1335, the method may include undeploying the application from the runtime engine instance based at least in part on a completion of executing the flow for the deployed application on the single message. The operations of 1335 may be performed in accordance with examples as disclosed herein. In some examples, aspects of the operations of 1335 may be performed by a runtime component 930 as described with reference to FIG. 9.

A method for SFE is described. The method may include receiving an indication to run an SFE for an application comprising one or more components, one or more connectors, one or more modules, or a combination thereof organized into a flow, deploying the application into a runtime engine instance in response to the indication to run the SFE, retrieving, using a polling source, one or more messages from an external source via a connector based at least in part on a polling trigger for the deployed application, disabling the connector to the external source based at least in part on retrieving the one or more messages, executing the flow for the deployed application on a single message of the one or more messages based at least in part on the indication to run the SFE, and undeploying the application from the runtime engine instance based at least in part on a completion of executing the flow for the deployed application on the single message.

An apparatus for SFE is described. The apparatus may include a processor, memory coupled with the processor, and instructions stored in the memory. The instructions may be executable by the processor to cause the apparatus to receive an indication to run an SFE for an application comprising one or more components, one or more connectors, one or more modules, or a combination thereof organized into a flow, deploy the application into a runtime engine instance in response to the indication to run the SFE, retrieve, using a polling source, one or more messages from an external source via a connector based at least in part on a polling trigger for the deployed application, disable the connector to the external source based at least in part on retrieving the one or more messages, execute the flow for the deployed application on a single message of the one or more messages based at least in part on the indication to run the SFE, and undeploy the application from the runtime engine instance based at least in part on a completion of executing the flow for the deployed application on the single message.

Another apparatus for SFE is described. The apparatus may include means for receiving an indication to run an SFE for an application comprising one or more components, one or more connectors, one or more modules, or a combination thereof organized into a flow, means for deploying the application into a runtime engine instance in response to the indication to run the SFE, means for retrieving, using a polling source, one or more messages from an external source via a connector based at least in part on a polling trigger for the deployed application, means for disabling the connector to the external source based at least in part on retrieving the one or more messages, means for executing the flow for the deployed application on a single message of the one or more messages based at least in part on the indication to run the SFE, and means for undeploying the application from the runtime engine instance based at least in part on a completion of executing the flow for the deployed application on the single message.

A non-transitory computer-readable medium storing code for SFE is described. The code may include instructions executable by a processor to receive an indication to run an SFE for an application comprising one or more components, one or more connectors, one or more modules, or a combination thereof organized into a flow, deploy the application into a runtime engine instance in response to the indication to run the SFE, retrieve, using a polling source, one or more messages from an external source via a connector based at least in part on a polling trigger for the deployed application, disable the connector to the external source based at least in part on retrieving the one or more messages, execute the flow for the deployed application on a single message of the one or more messages based at least in part on the indication to run the SFE, and undeploy the application from the runtime engine instance based at least in part on a completion of executing the flow for the deployed application on the single message.

Some examples of the method, apparatuses, and non-transitory computer-readable medium described herein may further include operations, features, means, or instructions for storing, at a collector, information related to the completion of executing the flow for the deployed application on the single message, wherein the application may be undeployed subsequent to storing the information at the collector.

In some examples of the method, apparatuses, and non-transitory computer-readable medium described herein, the information comprises transaction data resulting from executing the flow, one or more log messages generated from executing the flow, or both.

Some examples of the method, apparatuses, and non-transitory computer-readable medium described herein may further include operations, features, means, or instructions for sending, for display at a user interface of a user device, the information related to the completion of executing the flow for the deployed application on the single message.

Some examples of the method, apparatuses, and non-transitory computer-readable medium described herein may further include operations, features, means, or instructions for receiving, from a user interface of a user device, a first user input indicating a definition for the application, a second user input comprising the indication to run the SFE for the application, or both.

Some examples of the method, apparatuses, and non-transitory computer-readable medium described herein may further include operations, features, means, or instructions for updating a watermark to indicate that the single message was processed by the flow for the deployed application based at least in part on the completion of executing the flow for the deployed application on the single message.

Some examples of the method, apparatuses, and non-transitory computer-readable medium described herein may further include operations, features, means, or instructions for persisting the watermark external to the runtime engine instance.

In some examples of the method, apparatuses, and non-transitory computer-readable medium described herein, the one or more messages may be retrieved from the external source based at least in part on a current value of the watermark.

In some examples of the method, apparatuses, and non-transitory computer-readable medium described herein, the watermark comprises a timestamp, an incremental value, or both.

In some examples of the method, apparatuses, and non-transitory computer-readable medium described herein, the polling trigger comprises a frequency and the method, apparatuses, and non-transitory computer-readable medium may include further operations, features, means, or instructions for executing the polling source according to the frequency, wherein executing the polling source may include operations, features, means, or instructions for connecting to the external source via the connector and querying new data from the external source, wherein the one or more messages may be retrieved in response to the querying.

In some examples of the method, apparatuses, and non-transitory computer-readable medium described herein, the polling source tracks a watermark for the external source and the querying the new data comprises querying for data stored at the external source subsequent to the watermark for the external source.

Some examples of the method, apparatuses, and non-transitory computer-readable medium described herein may further include operations, features, means, or instructions for stopping the application based at least in part on executing the flow for the deployed application on the single message and releasing the runtime engine instance based at least in part on undeploying the application from the runtime engine instance.

In some examples of the method, apparatuses, and non-transitory computer-readable medium described herein, detecting, at a plugin, the completion of executing the flow for the deployed application on the single message and invoking, using the plugin, an application service, wherein the application may be undeployed from the runtime engine instance based at least in part on invoking the application service.

In some examples of the method, apparatuses, and non-transitory computer-readable medium described herein, executing the flow for the deployed application on the single message may include operations, features, means, or instructions for generating an event comprising the single message and metadata associated with the event, modifying the event based at least in part on the one or more components and a logical order of the flow, and determining a result of the completion of executing the flow for the deployed application on the single message based at least in part on the modified event.

In some examples of the method, apparatuses, and non-transitory computer-readable medium described herein, the indication to run the SFE for the application may be received at an orchestrator and the method, apparatuses, and non-transitory computer-readable medium may include further operations, features, means, or instructions for sending, by the orchestrator, the application and an indication of the SFE to a cluster controller, selecting, by the cluster controller, the runtime engine instance from a cluster of runtime engine instances, and calling, by the cluster controller, one or more endpoints to execute the SFE, wherein the application may be deployed to the selected runtime engine instance based at least in part on calling the one or more endpoints.

In some examples of the method, apparatuses, and non-transitory computer-readable medium described herein, the completion of executing the flow for the deployed application on the single message comprises the single message completing processing by each component of the one or more components of the flow, the single message completing processing by each component of a sub-flow of the flow based at least in part on a logical order of the flow, the executing the flow for the deployed application on the single message resulting in an execution failure, a time duration for executing the flow for the deployed application on the single message satisfying a timeout criterion, receiving a user request to stop executing the flow for the deployed application on the single message, or a combination thereof.

In some examples of the method, apparatuses, and non-transitory computer-readable medium described herein, the single message comprises a single data object, a single email message, a single SMS text message, a single voice call, or a single document.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for single flow execution, comprising:
    receiving an indication to run a single flow execution for an application comprising one or more components, one or more connectors, one or more modules, or a combination thereof organized into a flow;
    deploying the application into a runtime engine instance in response to the indication to run the single flow execution;
    retrieving, using a polling source, one or more messages from an external source via a connector based at least in part on a polling trigger for the deployed application;
    disabling the connector to the external source based at least in part on retrieving the one or more messages;
    executing the flow for the deployed application on a single message of the one or more messages based at least in part on the indication to run the single flow execution;
    storing, at a collector, information related to a completion of executing the flow for the deployed application on the single message; and
    undeploying, subsequent to storing the information, the application from the runtime engine instance based at least in part on the completion of executing the flow for the deployed application on the single message.

2. The method of claim 1, wherein the information comprises transaction data resulting from executing the flow, one or more log messages generated from executing the flow, or both.

3. The method of claim 1, further comprising:
    sending, for display at a user interface of a user device, the information related to the completion of executing the flow for the deployed application on the single message.

4. The method of claim 1, further comprising:
    receiving, from a user interface of a user device, a first user input indicating a definition for the application, a second user input comprising the indication to run the single flow execution for the application, or both.

5. The method of claim 1, further comprising:
    updating a watermark to indicate that the single message was processed by the flow for the deployed application based at least in part on the completion of executing the flow for the deployed application on the single message.

6. The method of claim 5, further comprising:
    persisting the watermark external to the runtime engine instance.

7. The method of claim 5, wherein the one or more messages are retrieved from the external source based at least in part on a current value of the watermark.

8. The method of claim 5, wherein the watermark comprises a timestamp, an incremental value, or both.

9. The method of claim 1, wherein the polling trigger comprises a frequency, the method further comprising:
    executing the polling source according to the frequency, wherein executing the polling source comprises:
        connecting to the external source via the connector; and
        querying new data from the external source, wherein the one or more messages are retrieved in response to the querying.

10. The method of claim 9, wherein:
    the polling source tracks a watermark for the external source; and
    the querying the new data comprises querying for data stored at the external source subsequent to the watermark for the external source.

11. The method of claim 1, further comprising:
    stopping the application based at least in part on executing the flow for the deployed application on the single message; and releasing the runtime engine instance based at least in part on undeploying the application from the runtime engine instance.

12. The method of claim 1, further comprising:
detecting, at a plugin, the completion of executing the flow for the deployed application on the single message; and
invoking, using the plugin, an application service, wherein the application is undeployed from the runtime engine instance based at least in part on invoking the application service.

13. The method of claim 1, wherein executing the flow for the deployed application on the single message comprises:
generating an event comprising the single message and metadata associated with the event;
modifying the event based at least in part on the one or more components and a logical order of the flow; and
determining a result of the completion of executing the flow for the deployed application on the single message based at least in part on the modified event.

14. The method of claim 1, wherein the indication to run the single flow execution for the application is received at an orchestrator, the method further comprising:
sending, by the orchestrator, the application and an indication of the single flow execution to a cluster controller;
selecting, by the cluster controller, the runtime engine instance from a cluster of runtime engine instances; and
calling, by the cluster controller, one or more endpoints to execute the single flow execution, wherein the application is deployed to the selected runtime engine instance based at least in part on calling the one or more endpoints.

15. The method of claim 1, wherein the completion of executing the flow for the deployed application on the single message comprises the single message completing processing by each component of the one or more components of the flow, the single message completing processing by each component of a sub-flow of the flow based at least in part on a logical order of the flow, the executing the flow for the deployed application on the single message resulting in an execution failure, a time duration for executing the flow for the deployed application on the single message satisfying a timeout criterion, receiving a user request to stop executing the flow for the deployed application on the single message, or a combination thereof.

16. The method of claim 1, wherein the single message comprises a single data object, a single email message, a single short message service (SMS) text message, a single voice call, or a single document.

17. An apparatus for single flow execution, comprising:
a processor;
memory coupled with the processor; and
instructions stored in the memory and executable by the processor to cause the apparatus to:
receive an indication to run a single flow execution for an application comprising one or more components, one or more connectors, one or more modules, or a combination thereof organized into a flow;
deploy the application into a runtime engine instance in response to the indication to run the single flow execution;
retrieve, using a polling source, one or more messages from an external source via a connector based at least in part on a polling trigger for the deployed application;
disable the connector to the external source based at least in part on retrieving the one or more messages;
execute the flow for the deployed application on a single message of the one or more messages based at least in part on the indication to run the single flow execution;
store, at a collector, information related to a completion of executing the flow for the deployed application on the single message; and
undeploy, subsequent to storing the information, the application from the runtime engine instance based at least in part on the completion of executing the flow for the deployed application on the single message.

18. A non-transitory computer-readable medium storing code for single flow execution, the code comprising instructions executable by a processor to:
receive an indication to run a single flow execution for an application comprising one or more components, one or more connectors, one or more modules, or a combination thereof organized into a flow;
deploy the application into a runtime engine instance in response to the indication to run the single flow execution;
retrieve, using a polling source, one or more messages from an external source via a connector based at least in part on a polling trigger for the deployed application;
disable the connector to the external source based at least in part on retrieving the one or more messages;
execute the flow for the deployed application on a single message of the one or more messages based at least in part on the indication to run the single flow execution;
store, at a collector, information related to a completion of executing the flow for the deployed application on the single message; and
undeploy, subsequent to storing the information, the application from the runtime engine instance based at least in part on the completion of executing the flow for the deployed application on the single message.

* * * * *